(12) United States Patent
Uken

(10) Patent No.: US 7,527,403 B2
(45) Date of Patent: May 5, 2009

(54) MIRROR ASSEMBLY FOR VEHICLE

(75) Inventor: John T. Uken, Jenison, MI (US)

(73) Assignee: Donnelly Corp., Holland, MI (US)

( * ) Notice: Subject to any disclaimer, the term of this patent is extended or adjusted under 35 U.S.C. 154(b) by 0 days.

(21) Appl. No.: 11/451,639

(22) Filed: Jun. 13, 2006

(65) Prior Publication Data

US 2007/0019426 A1    Jan. 25, 2007

Related U.S. Application Data

(60) Provisional application No. 60/749,423, filed on Dec. 12, 2005, provisional application No. 60/719,482, filed on Sep. 22, 2005, provisional application No. 60/690,401, filed on Jun. 14, 2005.

(51) Int. Cl.
*B60Q 1/26* (2006.01)
(52) U.S. Cl. .................. 362/494; 362/487; 362/488
(58) Field of Classification Search ............ 362/459, 362/487, 488, 494, 492, 560, 489; 359/838–884; D12/187–189
See application file for complete search history.

(56) References Cited

U.S. PATENT DOCUMENTS

| | | | |
|---|---|---|---|
| 4,436,371 A | 3/1984 | Wood et al. | |
| 4,807,096 A | 2/1989 | Skogler et al. | |
| 4,826,289 A | 5/1989 | Vandenbrink et al. | |
| 4,862,594 A | 9/1989 | Schierbeek et al. | |
| 4,936,533 A | 6/1990 | Adams et al. | |
| 4,937,945 A | 7/1990 | Schofield et al. | |
| 5,100,095 A | 3/1992 | Haan et al. | |
| 5,131,154 A | 7/1992 | Schierbeek et al. | |
| 5,255,442 A | 10/1993 | Schierbeek et al. | |
| 5,550,677 A | 8/1996 | Schofield et al. | |
| 5,576,687 A | 11/1996 | Blank et al. | |
| 5,594,222 A | 1/1997 | Caldwell | |
| 5,632,092 A | 5/1997 | Blank et al. | |
| 5,649,756 A | 7/1997 | Adams et al. | |
| 5,668,663 A | 9/1997 | Varaprasad et al. | |
| 5,673,994 A | 10/1997 | Fant, Jr. et al. | |
| 5,708,410 A | 1/1998 | Blank et al. | |
| 5,724,187 A | 3/1998 | Varaprasad et al. | |
| 5,786,772 A | 7/1998 | Schofield et al. | |
| 5,796,094 A | 8/1998 | Schofield et al. | |
| 5,798,688 A | 8/1998 | Schofield | |
| 5,820,097 A | 10/1998 | Spooner | |
| 5,820,245 A | 10/1998 | Desmond et al. | |
| D400,481 S * | 11/1998 | Stephens et al. | ............ D12/187 |
| D402,950 S * | 12/1998 | Fitzpatrick | ................ D12/187 |
| 5,877,897 A | 3/1999 | Schofield et al. | |
| 5,878,353 A | 3/1999 | Ul Azam et al. | |
| 5,924,212 A | 7/1999 | Domanski | |

(Continued)

*Primary Examiner*—Anabel Ton
*Assistant Examiner*—Kevin Spinella
(74) *Attorney, Agent, or Firm*—Van Dyke, Gardner, Linn & Burkhart, LLP

(57) ABSTRACT

An interior rearview mirror assembly for a vehicle includes a reflective element, a frame portion around a perimeter of the reflective element, and one or more user inputs or buttons movably mounted to the frame portion. At least one bezel segment is positioned partially around the perimeter of the reflective element and frame portion and defines a space or gap along the frame portion between opposed and spaced apart ends of the bezel segment or segments. The input or button is mountable to the frame portion at the space and is movable by a user to engage and actuate an electronic switch within the mirror assembly.

9 Claims, 27 Drawing Sheets

U.S. PATENT DOCUMENTS

| | | | |
|---|---|---|---|
| 5,929,786 A | 7/1999 | Schofield et al. | |
| 5,940,503 A | 8/1999 | Palett et al. | |
| 5,971,552 A | 10/1999 | O'Farrell et al. | |
| 6,000,823 A | 12/1999 | Desmond et al. | |
| 6,001,486 A | 12/1999 | Varaprasad et al. | |
| 6,097,023 A | 8/2000 | Schofield et al. | |
| 6,170,956 B1 * | 1/2001 | Rumsey et al. | 359/839 |
| 6,243,003 B1 | 6/2001 | DeLine et al. | |
| 6,250,148 B1 | 6/2001 | Lynam | |
| 6,278,377 B1 | 8/2001 | DeLine et al. | |
| 6,310,611 B1 | 10/2001 | Caldwell | |
| 6,313,454 B1 | 11/2001 | Bos et al. | |
| 6,318,870 B1 | 11/2001 | Spooner et al. | |
| 6,320,176 B1 | 11/2001 | Schofield et al. | |
| 6,320,282 B1 | 11/2001 | Caldwell | |
| D451,869 S * | 12/2001 | Knapp et al. | D12/187 |
| 6,326,613 B1 | 12/2001 | Heslin et al. | |
| 6,329,925 B1 | 12/2001 | Skiver et al. | |
| 6,341,523 B2 | 1/2002 | Lynam | |
| 6,353,392 B1 | 3/2002 | Schofield et al. | |
| 6,369,804 B1 | 4/2002 | Sandbach | |
| 6,407,468 B1 * | 6/2002 | LeVesque et al. | 307/10.1 |
| 6,412,973 B1 * | 7/2002 | Bos et al. | 362/494 |
| 6,420,800 B1 * | 7/2002 | LeVesque et al. | 307/10.1 |
| 6,420,975 B1 | 7/2002 | DeLine et al. | |
| 6,428,172 B1 | 8/2002 | Hutzel et al. | |
| 6,437,258 B1 | 8/2002 | Sandbach | |
| 6,439,755 B1 | 8/2002 | Fant, Jr. et al. | |
| 6,452,479 B1 | 9/2002 | Sandbach | |
| 6,471,362 B1 * | 10/2002 | Carter et al. | 359/871 |
| 6,477,464 B2 | 11/2002 | McCarthy et al. | |
| D466,456 S * | 12/2002 | Carter et al. | D12/187 |
| 6,492,980 B2 | 12/2002 | Sandbach | |
| 6,501,387 B2 | 12/2002 | Skiver et al. | |
| 6,501,465 B2 | 12/2002 | Sandbach | |
| 6,504,531 B1 | 1/2003 | Sandbach | |
| 6,572,233 B1 * | 6/2003 | Northman et al. | 359/839 |
| 6,593,565 B2 | 7/2003 | Heslin et al. | |
| 6,614,241 B2 | 9/2003 | Schmitt et al. | |
| 6,627,918 B2 | 9/2003 | Getz et al. | |
| 6,648,477 B2 | 11/2003 | Hutzel et al. | |
| 6,678,614 B2 | 1/2004 | McCarthy et al. | |
| 6,690,268 B2 | 2/2004 | Schofield et al. | |
| 6,714,331 B2 | 3/2004 | Lewis et al. | |
| 6,756,912 B2 | 6/2004 | Skiver et al. | |
| 6,762,867 B2 | 7/2004 | Lippert et al. | |
| 6,795,221 B1 | 9/2004 | Urey | |
| 6,824,281 B2 | 11/2004 | Schofield et al. | |
| 6,847,487 B2 | 1/2005 | Burgner | |
| 6,882,287 B2 | 4/2005 | Schofield | |
| 6,946,978 B2 | 9/2005 | Schofield | |
| 7,004,593 B2 | 2/2006 | Weller et al. | |
| 7,167,796 B2 | 1/2007 | Taylor et al. | |
| 7,253,723 B2 | 8/2007 | Lindahl et al. | |
| 7,255,451 B2 | 8/2007 | McCabe et al. | |
| 2002/0044065 A1 | 4/2002 | Quist et al. | |
| 2002/0159270 A1 | 10/2002 | Lynam et al. | |
| 2003/0236622 A1 | 12/2003 | Schofield | |
| 2004/0016870 A1 | 1/2004 | Pawlicki et al. | |
| 2004/0032675 A1 | 2/2004 | Weller et al. | |
| 2004/0128065 A1 | 7/2004 | Taylor et al. | |
| 2004/0246607 A1 * | 12/2004 | Watson et al. | 359/872 |
| 2005/0078389 A1 | 4/2005 | Kulas et al. | |
| 2005/0099693 A1 | 5/2005 | Schofield et al. | |
| 2005/0134983 A1 | 6/2005 | Lynam | |
| 2005/0169003 A1 * | 8/2005 | Lindahl et al. | 362/494 |
| 2005/0187675 A1 | 8/2005 | Schofield et al. | |
| 2005/0195488 A1 | 9/2005 | McCabe et al. | |
| 2005/0231969 A1 * | 10/2005 | Fogg et al. | 362/494 |
| 2005/0264891 A1 | 12/2005 | Uken et al. | |
| 2006/0109996 A1 | 5/2006 | Larson et al. | |
| 2006/0255960 A1 | 11/2006 | Uken et al. | |

* cited by examiner

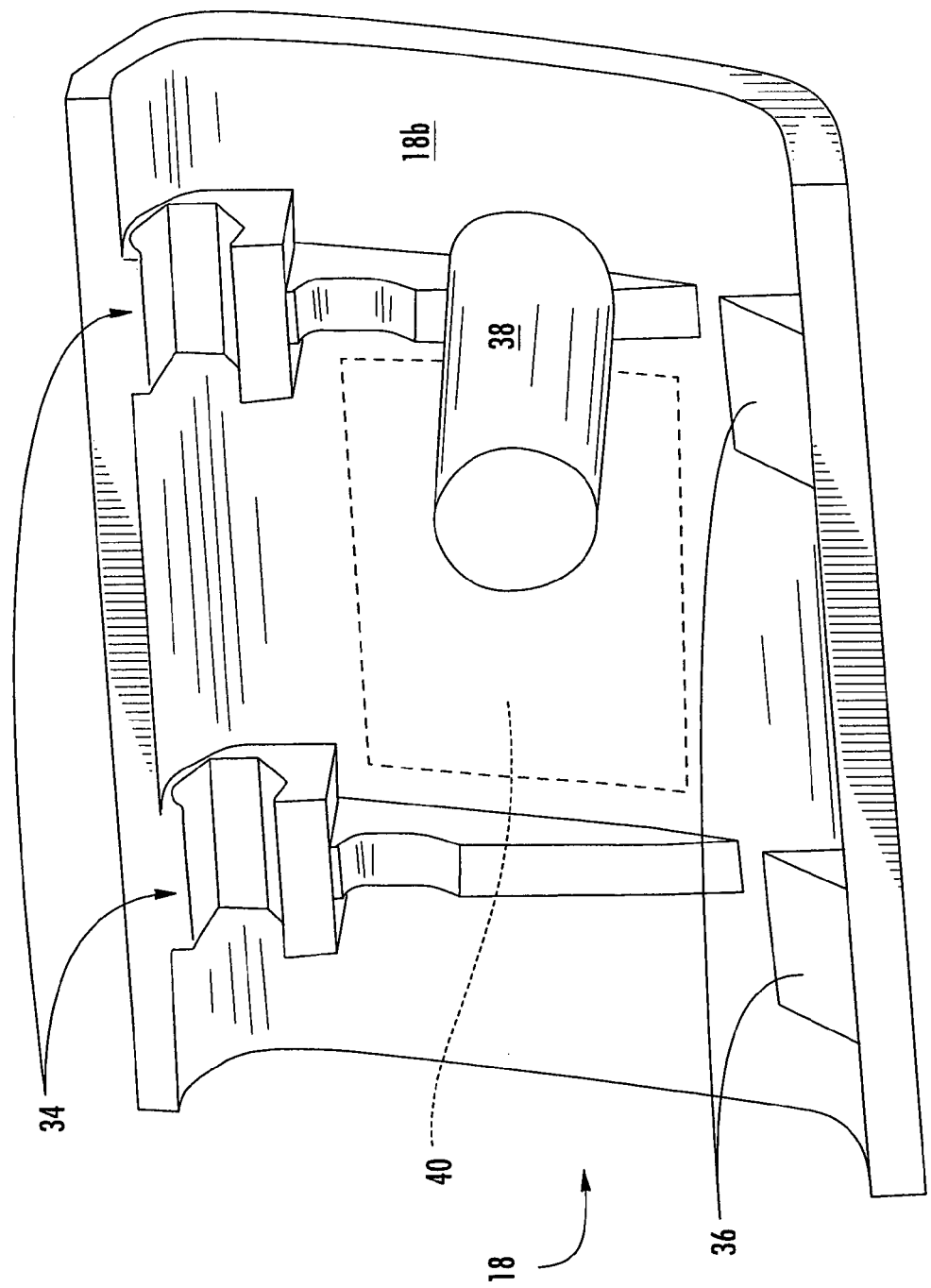

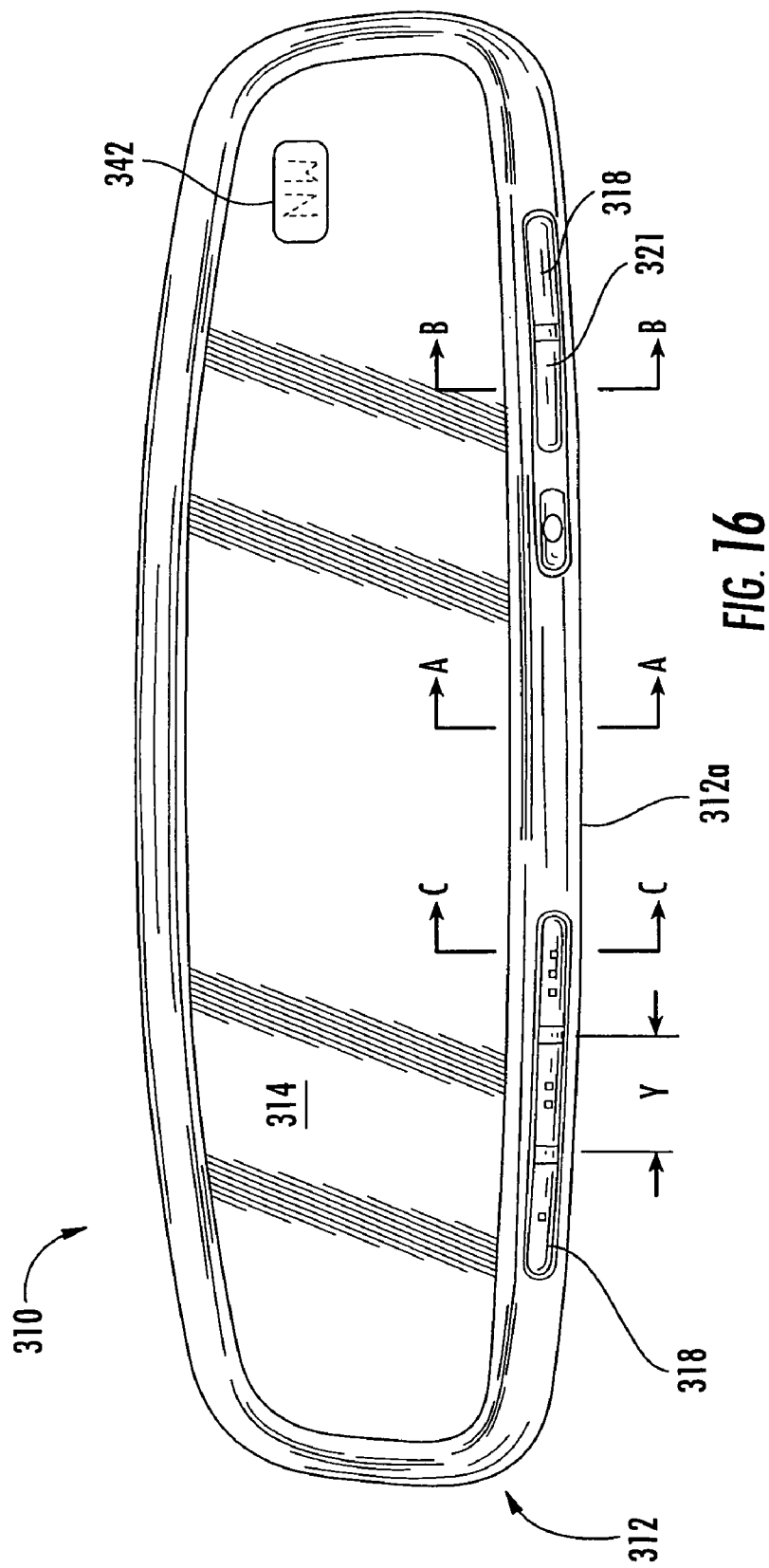

MIRROR ASSEMBLY FOR VEHICLE

CROSS REFERENCE TO RELATED APPLICATIONS

The present application claims the benefit of U.S. provisional applications, Ser. No. 60/690,401, filed Jun. 14, 2005; Ser. No. 60/719,482, filed Sep. 22, 2005; and Ser. No. 60/749,423, filed Dec. 12, 2005, which are all hereby incorporated herein by reference in their entireties.

FIELD OF THE INVENTION

The present invention relates generally to the field of interior rearview mirror assemblies for vehicles and, more particularly, to interior rearview mirror assemblies which incorporate an accessory or feature, particularly an electronic accessory or feature.

BACKGROUND OF THE INVENTION

It is often desirable to provide an electronic feature in or at a vehicular interior rearview mirror assembly, such as a trainable garage door opener, a compass sensor and/or compass display, a tire pressure monitoring system receiver and/or display and/or the like, often along with the user inputs or buttons or switches associated with such systems and/or displays. The buttons may comprise manual push buttons positioned along a lower chin portion of the bezel or casing of the mirror assembly or may be touch or proximity-sensing sensors. For example, and as disclosed in U.S. Pat. No. 6,471,362, which is hereby incorporated herein by reference, the buttons may be positioned at a chin portion of the bezel, such as within an opening in the chin portion of the bezel. While such an approach has achieved limited commercial success, there are shortcomings with the likes of such three-sided openings in bezels.

Therefore, there is a need in the art for an improved mirror assembly which overcomes the shortcomings of the prior art.

SUMMARY OF THE INVENTION

The present invention provides an interior rearview mirror assembly which has a bezel or bezel portion that extends partially around a perimeter of a reflective element and that defines spaces between opposed and spaced apart end portions of the bezel. One or more user inputs or buttons are disposed in the mirror assembly at the spaces so that the inputs are located at areas where there is no bezel. The user inputs or buttons are preferably formed so that their exterior surfaces substantially correspond to the outer or exterior surface of the bezel portions to provide a generally continuous perimeter at the reflective element.

In prior art interior mirror assemblies, and in particular in prior art electro-optic (such as electrochromic) interior mirror assemblies, a bezel that fully circumscribes the perimeter of the reflective element is common, such as is typified in FIG. 14. Moreover, and such as is typified in FIG. 15, not only does such a prior art bezel fully circumscribe the perimeter of the reflective element, the portion of the bezel where user inputs, such as buttons, are located is increased in width, such as via a "chin" portion of the bezel, to accommodate such buttons or similar user inputs. In sharp contrast to such prior art constructions, the bezel of the present invention does not fully circumscribe the perimeter of the reflective element. Nor does the bezel of the present invention require or utilize the complexities and costs of the construction disclosed in U.S. Pat. No. 6,471,362, which is hereby incorporated herein by reference. For example, and referring such as to FIG. 15 (which is a reproduction of FIG. 1 of U.S. Pat. No. 6,471,362), the present invention does not require or utilize a bezel including a section of material defining a three-sided button opening having an open side on a face of the bezel, nor does the present invention require or utilize a bezel having a ring-shaped body, nor does the present invention require or utilize a bezel including a "chin" section of material below the bottom edge of the reflective viewing area that defines a button opening on a face of the bezel.

According to an aspect of the present invention, an interior rearview mirror assembly for a vehicle comprises a reflective element, a frame portion around a perimeter of the reflective element, and one or more user inputs or buttons movably mounted to the frame portion. At least one bezel segment is positioned partially around the perimeter of the reflective element and frame portion and defines a space or gap along the frame portion between opposed and spaced apart ends of the bezel segment or segments. The input or button is mountable to the frame portion at the space and is movable by a user to engage and actuate an electronic switch within the mirror assembly.

The input may have an exterior surface that is curved or otherwise formed to generally correspond with the exterior surface of the bezel segment or segments adjacent to the input, so that the input and bezel segments cooperate to define a generally continuous trim portion along the perimeter region of the reflective element. The user input may be readily snapped or attached to an attachment element of the frame portion and may include an extension for contacting the switch when the user input is pivoted about the attachment element, such as by a user pressing the input.

Therefore, the present invention provides an interior rearview mirror assembly which has one or more user inputs or buttons positioned along a perimeter region of the reflective element and in a space or area that does not have a bezel. The inputs thus may be sufficiently large (and may have a height that generally corresponds to the height of the adjacent bezel segments) so as to be readily discerned and accessed by a user. The inputs may be readily attached or snapped to the frame portion in the gap or space between the ends of the bezel segment or segments, so as to enhance the assembly processes of the mirror assembly. The present invention may also obviate the complexities associated with providing three-sided buttons within an enlarged bezel or chin portion of a mirror assembly.

These and other objects, advantages, purposes and features of the present invention will become apparent upon review of the following specification in conjunction with the drawings.

BRIEF DESCRIPTION OF THE DRAWINGS

FIG. 10 is an enlarged rear perspective view of the button of FIG. 9;

FIG. 11 is a front elevation of another interior rearview mirror assembly in accordance with the present invention;

FIG. 16 is a front elevation of another interior rearview mirror assembly in accordance with the present invention;

DESCRIPTION OF THE PREFERRED EMBODIMENTS

Figure 1:
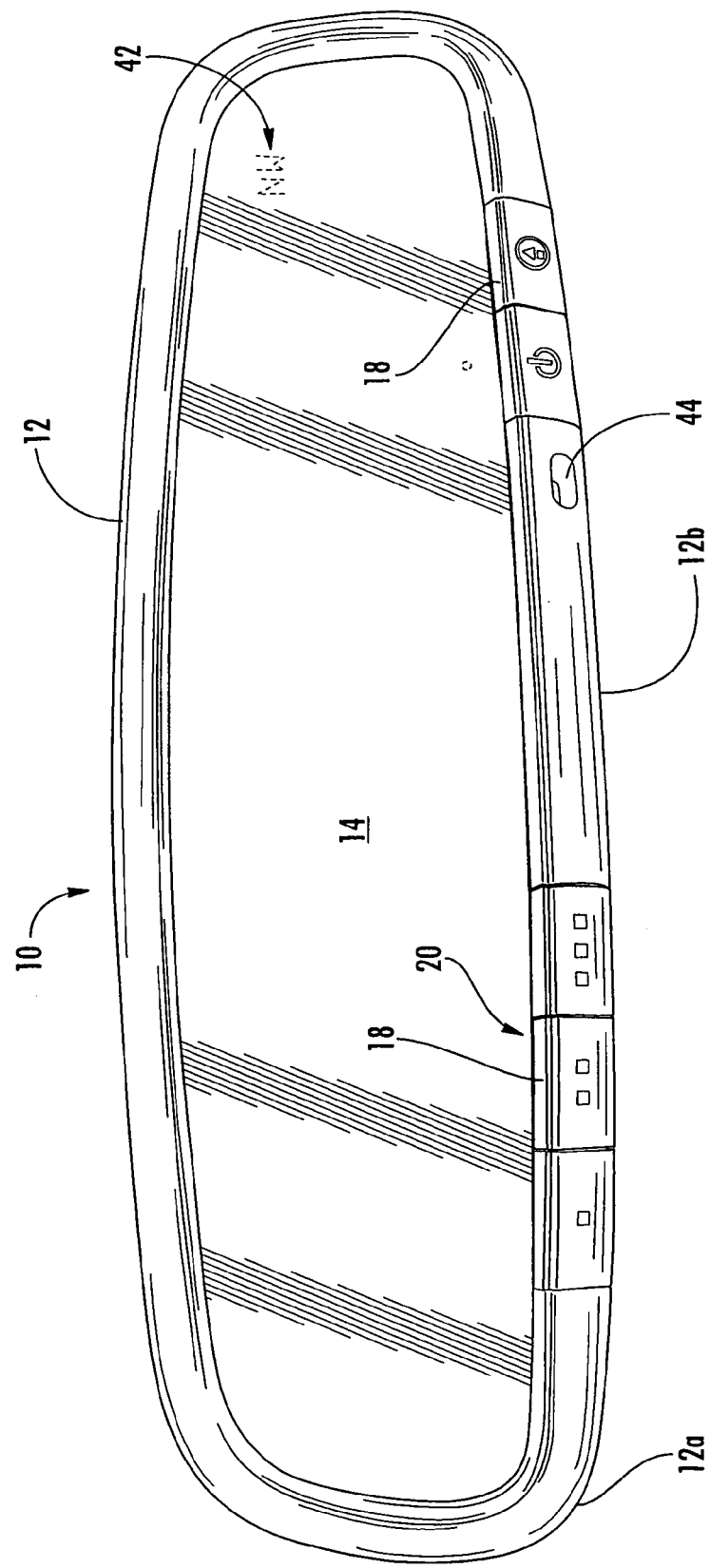
FIG. 1 is a front elevation of an interior rearview mirror assembly in accordance with the present invention.
Figure 2:
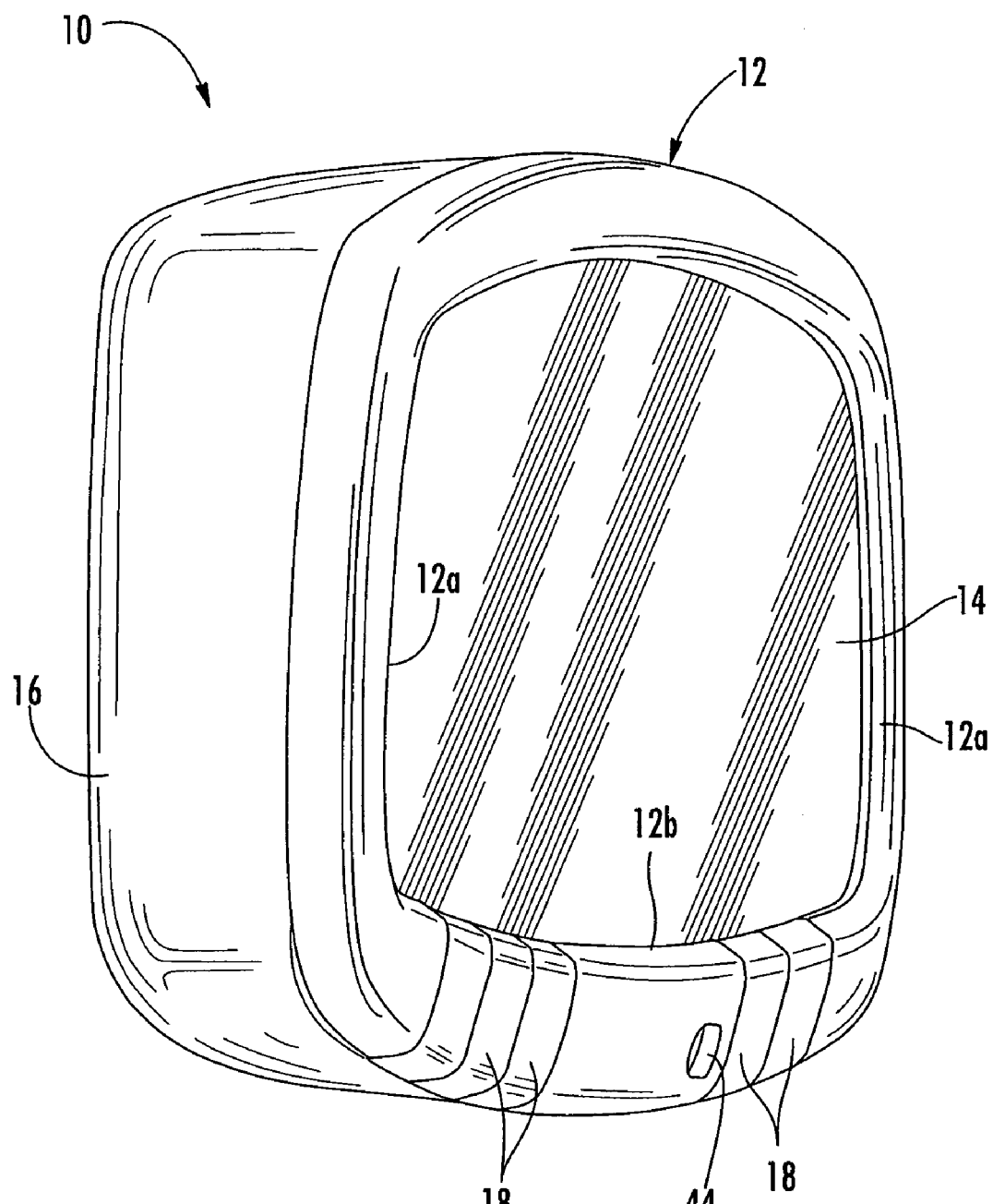
FIG. 2 is a side perspective view of the interior rearview mirror assembly of FIG. 1.
Figure 3:
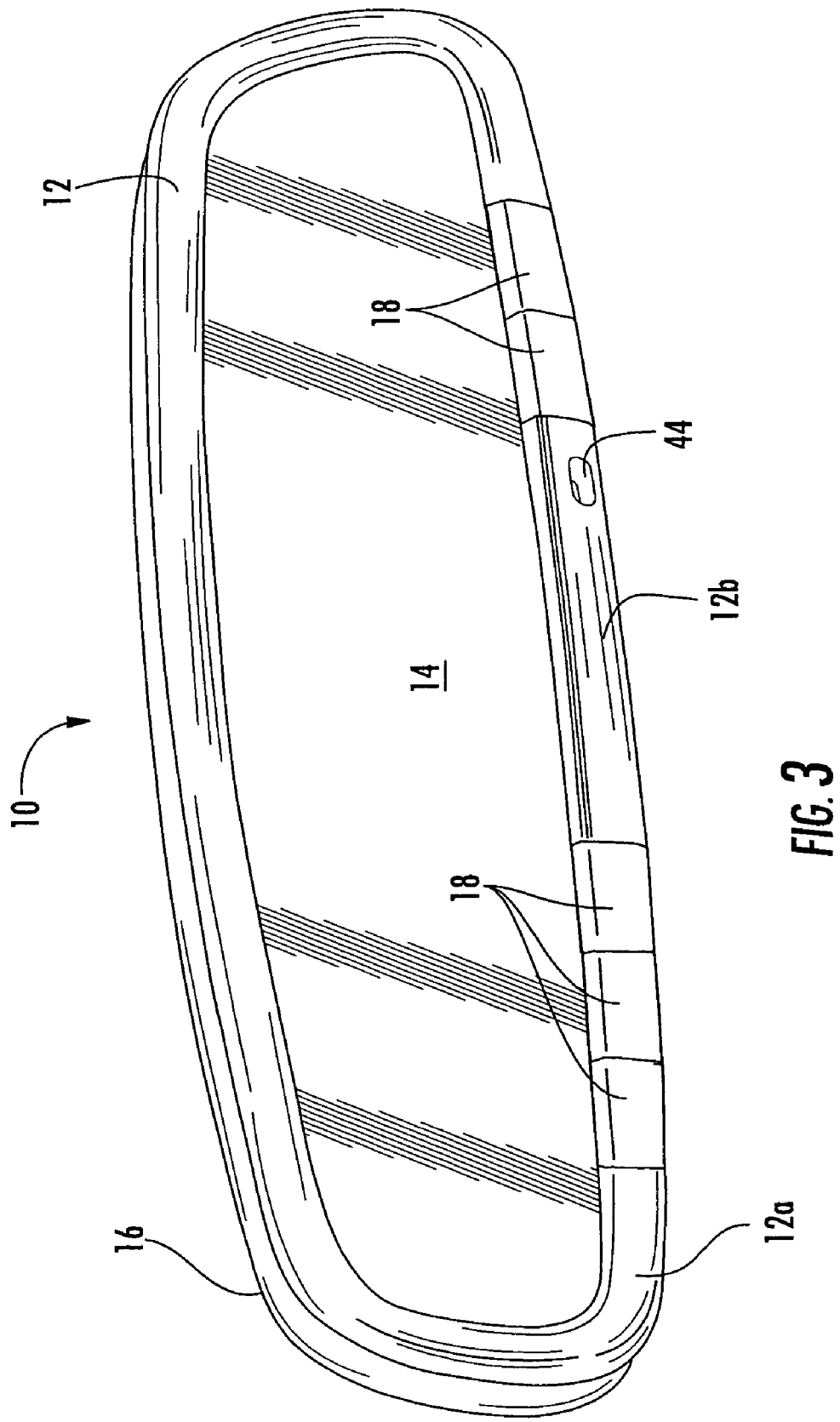
FIG. 3 is a front perspective view of an interior rearview mirror assembly of the present invention.

Referring now to the drawings and the illustrative embodiments depicted therein, an interior rearview mirror assembly 10 for a vehicle includes a bezel portion 12, a mirror reflective element 14 positioned at the bezel portion, and a rear casing portion 16 (FIGS. 1-4). Mirror assembly 10 may include or may be associated with an electronic accessory or device or circuitry or display, and may include one or more user inputs or buttons or switches 18 positioned along a perimeter region of the reflective element 14 for activating/deactivating and/or controlling the electronic accessory. User inputs 18 may be positioned along the perimeter region of the reflective element, such as along a lower perimeter region of the reflective element, and in a location where there is a gap or space between separated or spaced apart portions or segments 12a, 12b of the bezel 12, as discussed below. As can be seen in FIG. 2, the user inputs 18 fill in the spaces between the bezel segments to replace the bezel at the spaces between the bezel segments. The present invention thus provides large user inputs at a perimeter region of the reflective element, without requiring an opening to be formed in the bezel for receiving the user inputs.

Figure 12:
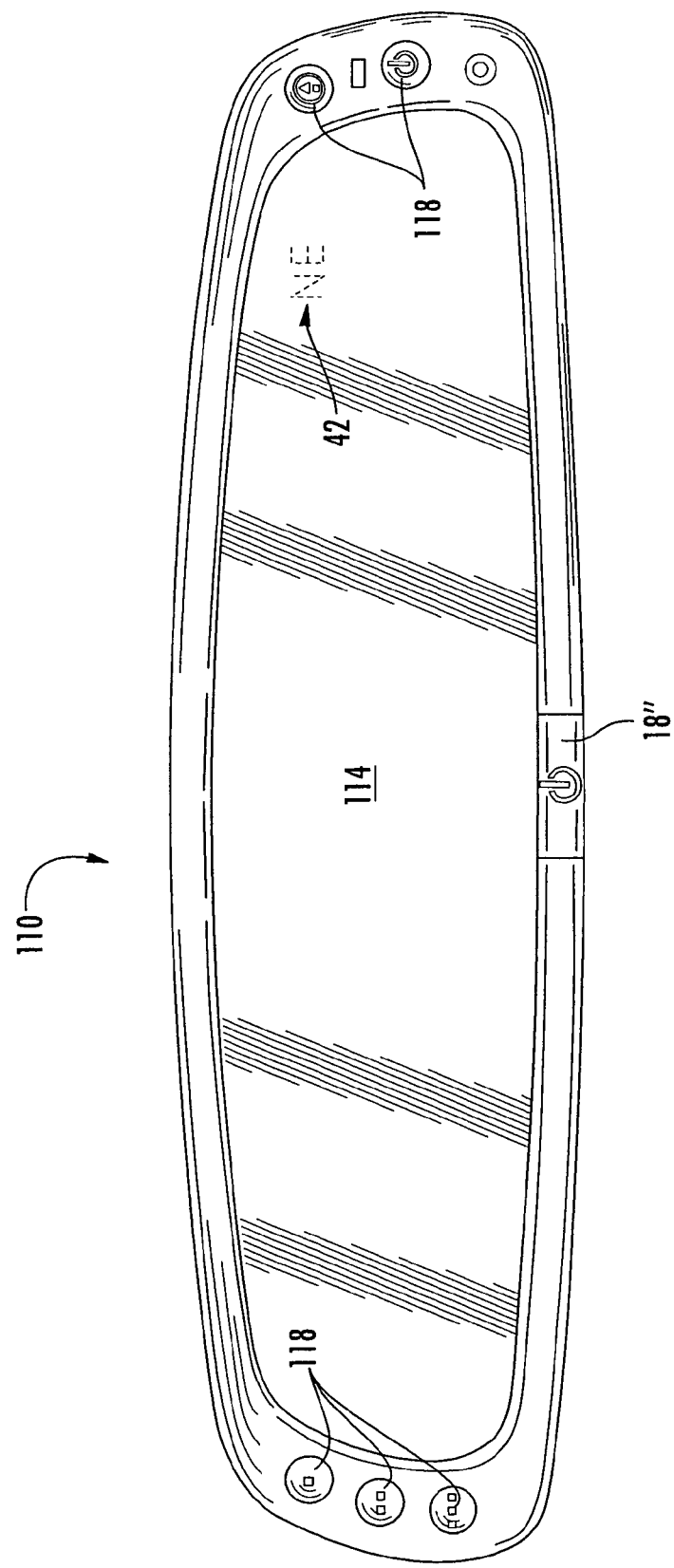
FIG. 12 is a front elevation of another interior rearview mirror assembly in accordance with the present invention.
Figure 15:
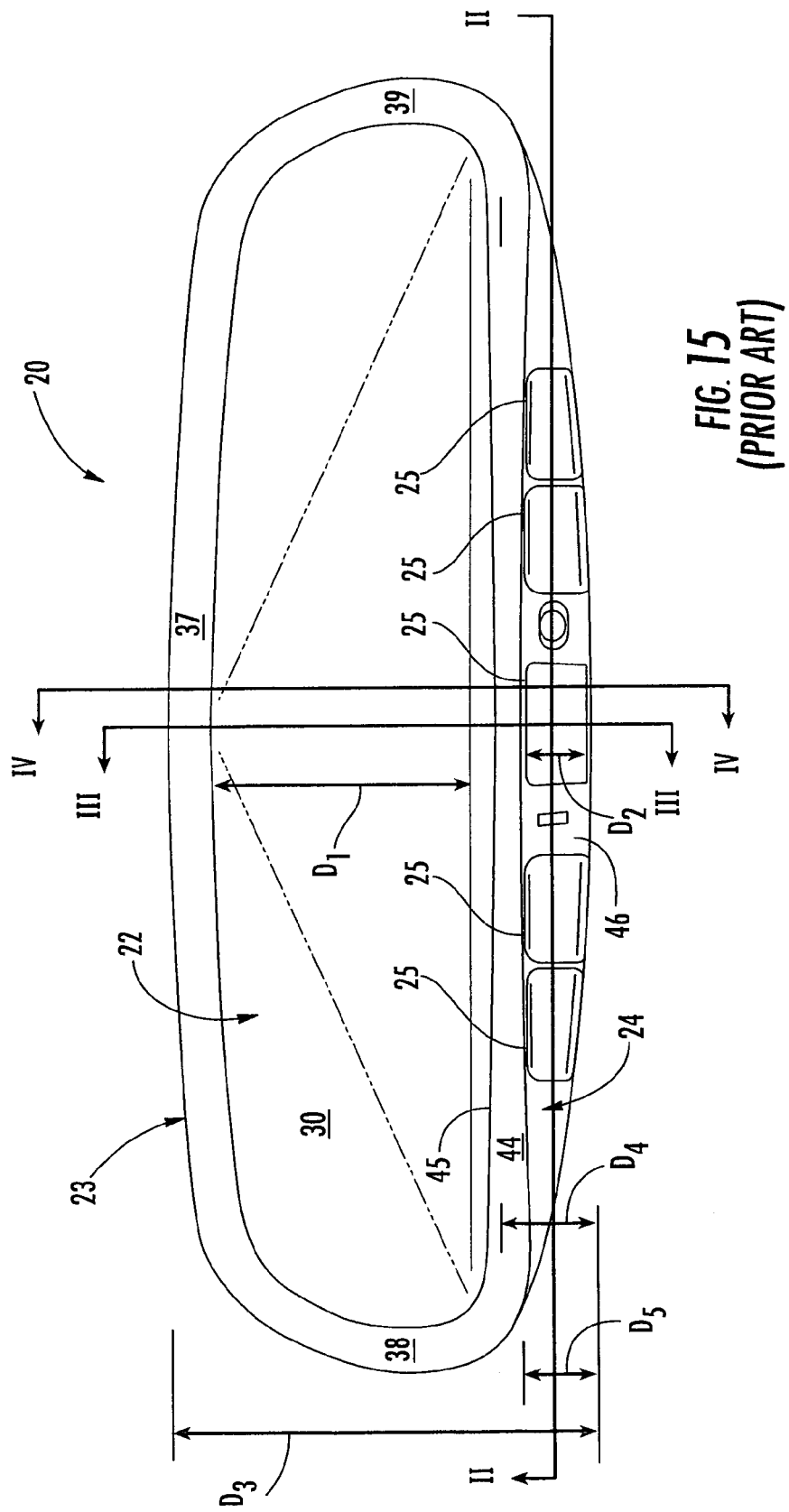
FIG. 15 is a reproduction of FIG. 1 of U.S. Pat. No. 6,471,362.

It is sometimes desirable for at least the upper and lower portions of the bezel to be similarly dimensioned at least in width or height (the dimension extending generally vertically across the upper/lower bezel portion when the mirror assembly is installed in a vehicle). Such similarly dimensioned upper and lower bezel portions 12a', 12b' are shown at mirror assembly 10' in FIG. 11, with similarly dimensioned widths A, A', respectively. As can be seen in FIG. 11, a user input or button 18' may be positioned at the upper perimeter region of the mirror reflective element 10' and between opposed and spaced apart ends of respective upper bezel portions, and/or, and as can be seen in FIG. 12, a user input or button 18" may be positioned at a lower perimeter region of the mirror reflective element 110 and between opposed and spaced apart ends of respective lower bezel portions. Although shown and described herein as being generally similarly sized and dimensioned as the terminal ends of the respective adjacent bezel portions or segments, the user inputs or buttons of the present invention may be at least the height or width of the adjacent bezel portions or may be taller or larger than the adjacent bezel portions or segments. For example, the user inputs or buttons of the present invention may be taller than the adjacent bezel portions or segments and may wrap around the upper or lower frame portion if desired. The bezel terminal ends, between which the buttons or inputs or switches are separately located, thus need not have a wider or taller dimension than the rest of the bezel (such as the increased dimension of a chin portion for receiving three-sided buttons within openings in the chin portion, such as shown in FIG. 15).

Figure 14:
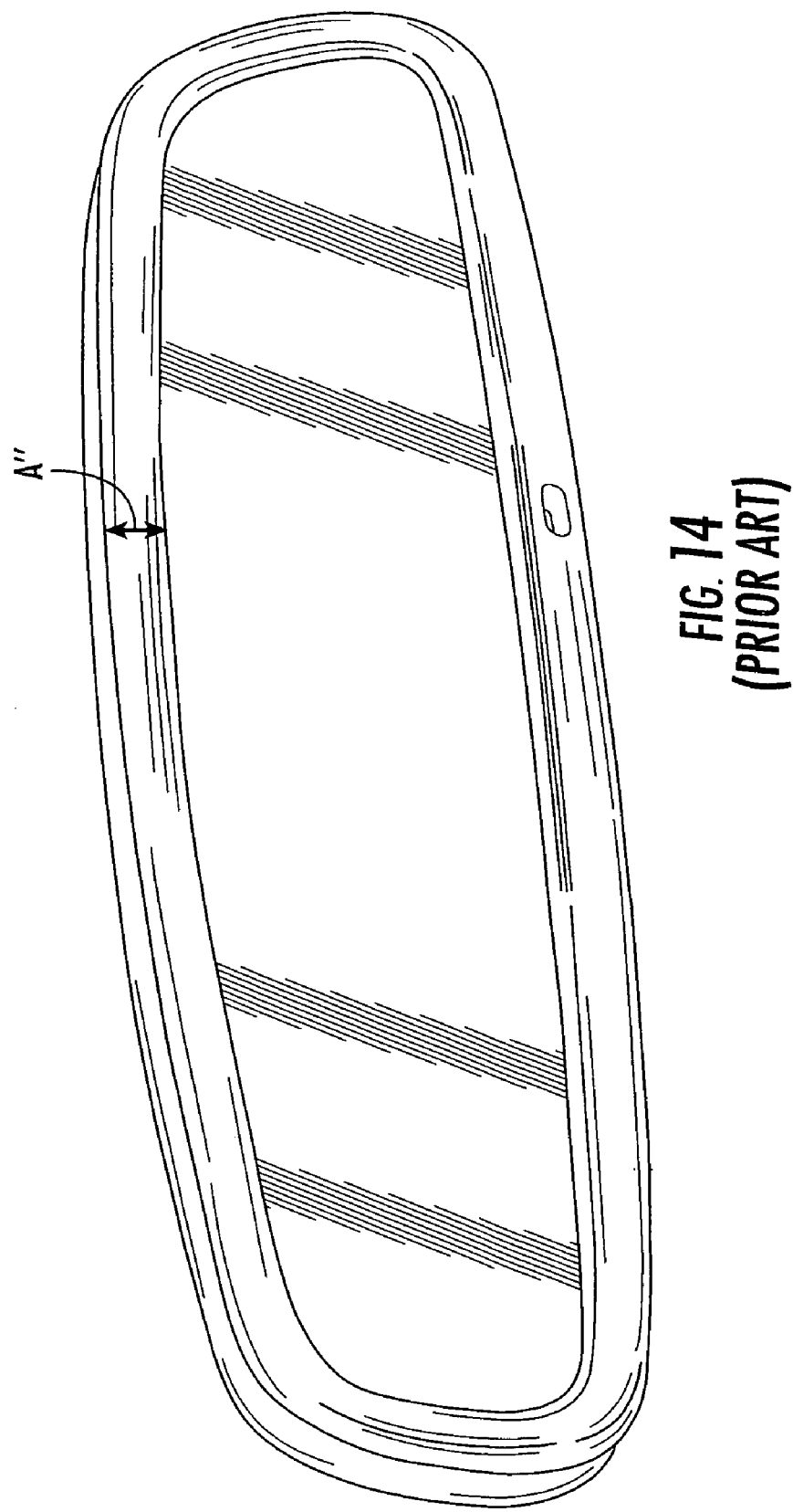
FIG. 14 is a front perspective view of an interior rearview mirror assembly that has a typical bezel circumscribing the perimeter of the reflective element.

As shown in FIG. 14, prior art bezels desirably have as narrow a width or height (the dimension A" in FIG. 14) as is practically implementable. For example, and in the prior art electrochromic mirror assemblies, where buttons are not included at a bezel section or portion, the bezel width is desirably typically less than about 10 mm, more preferably less than about 8 mm and more preferably less than about 6 mm. In order to accommodate large buttons, other prior art constructions, such as shown in FIG. 15, have typically required the likes of the "chin" included at the bezel portion and where the buttons are located. In stark contrast to such prior art constructions, the present invention accommodates buttons that are no narrower than the bezel or bezel portion that is adjacent to the buttons. For example, if the width of the bezel at its terminal end adjacent to the button or input is about 8 mm, then the button of the present invention may have a height dimension of about 8 mm (+/- about, for example, 5 percent or lower of the height dimension of the adjacent bezel portion). Alternatively, the button or input can be the same size or height as the adjacent bezel portion or can be larger than the adjacent bezel portion. The large button or input (relative to the bezel portion adjacent to the input or inputs) thus may announce and draw attention to the driver of the location of the user input or button adjacent to and between spaced apart bezel portions of the mirror assembly.

Figure 4:
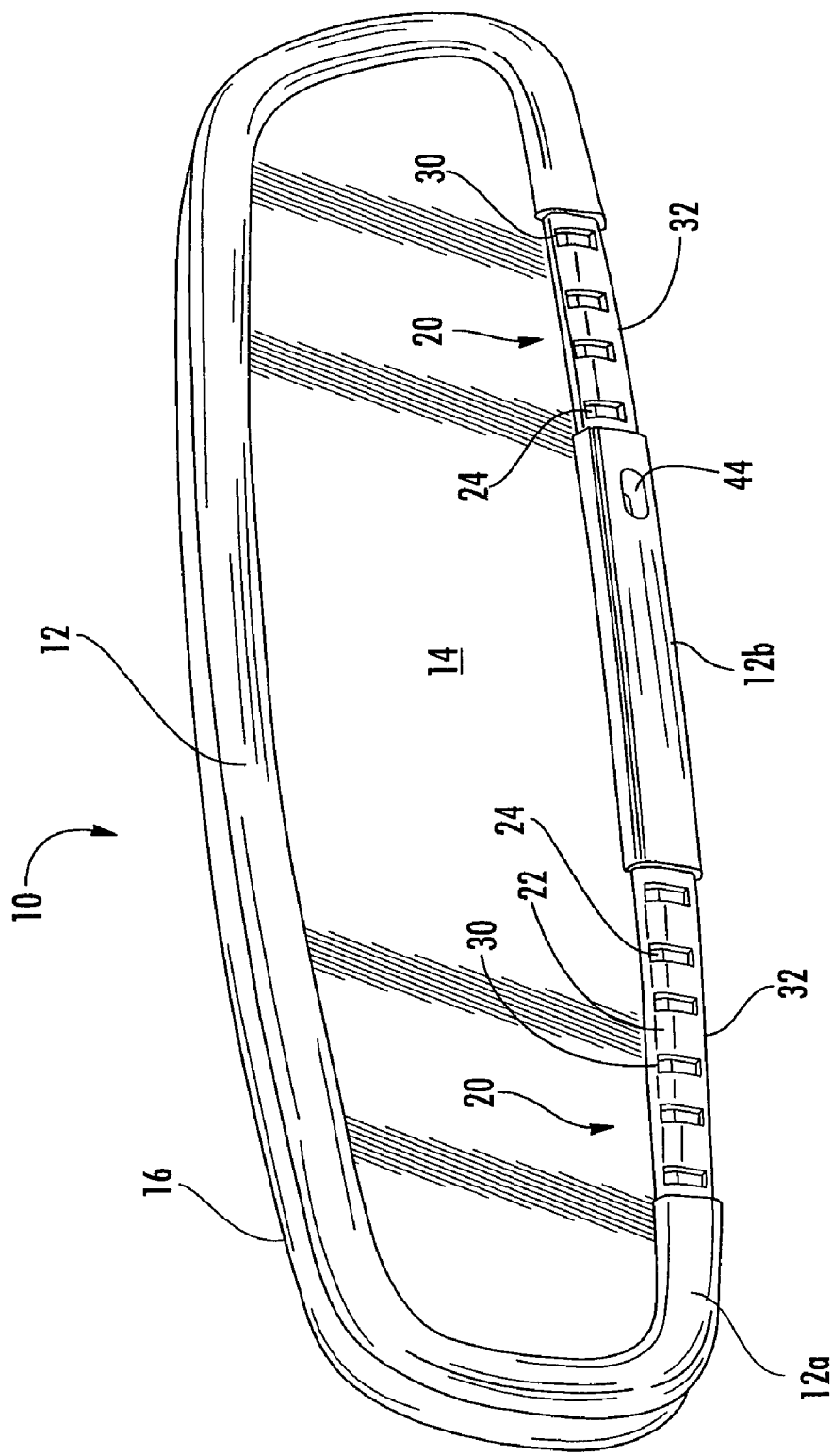
FIG. 4 is another front perspective view similar to FIG. 3, with the buttons removed from the mirror assembly.
Figure 5:
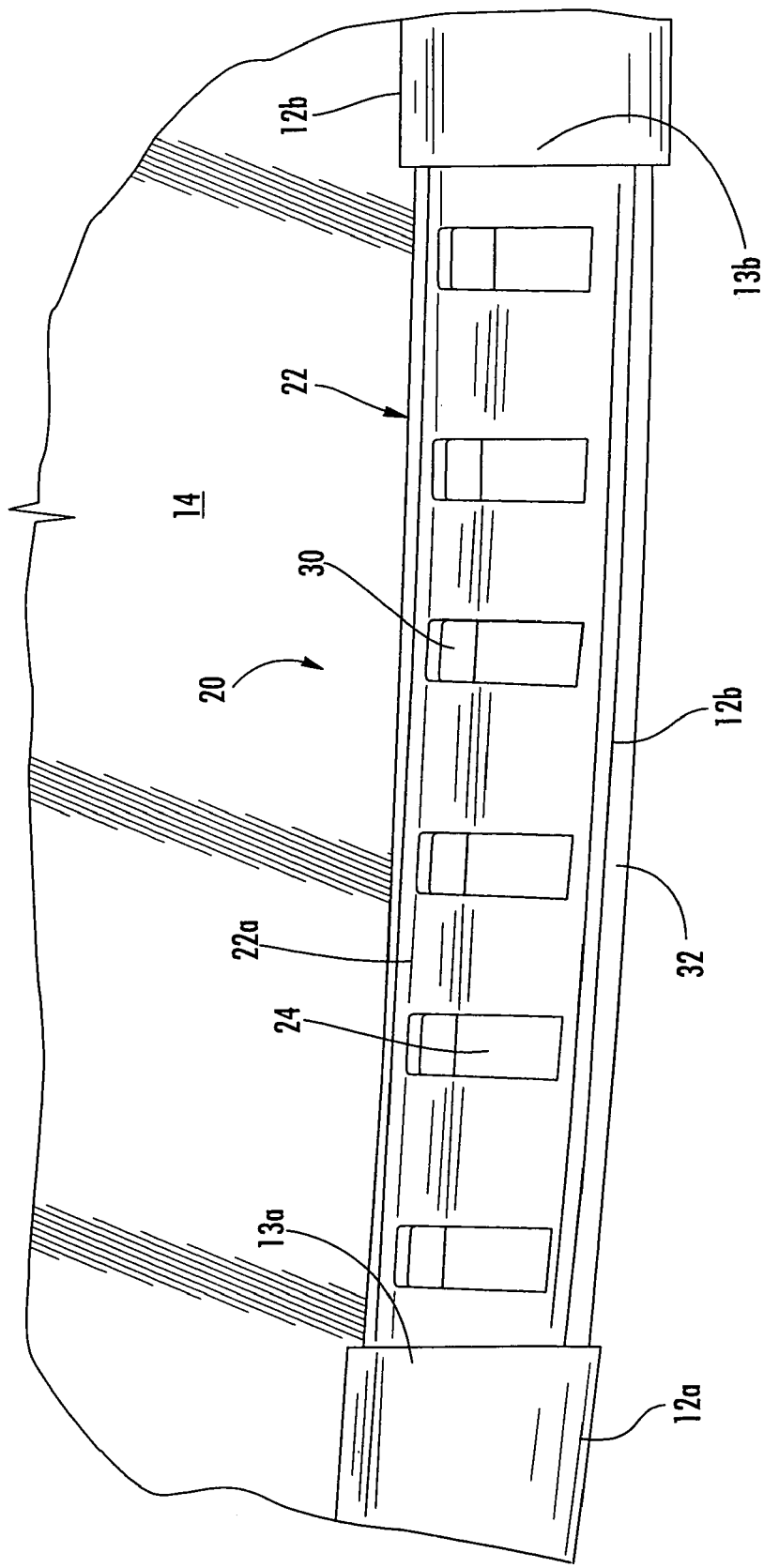
FIG. 5 is an enlarged front perspective view of the button areas of the mirror assembly, with the buttons removed from the mirror assembly.

As shown in FIGS. 4 and 5, bezel portion 12 may comprise one or more segments (such as two segments 12a, 12b as shown in FIGS. 1-4), which are positioned partially around the perimeter of the reflective element. The bezel segments 12a, 12b have opposed and spaced apart terminal ends 13a, 13b so that the mirror assembly has one or more bezelless perimeter regions or spaces 20 defined between the spaced apart ends of the bezel segment or segments. The user inputs 18 are positioned at the spaces 20 so as to substantially fill in the bezelless spaces. The exterior surface of the user inputs may be formed to substantially correspond to the exterior surface of the bezel segments to provide a substantially continuous appearance along the perimeter of the reflective element.

Figure 6:
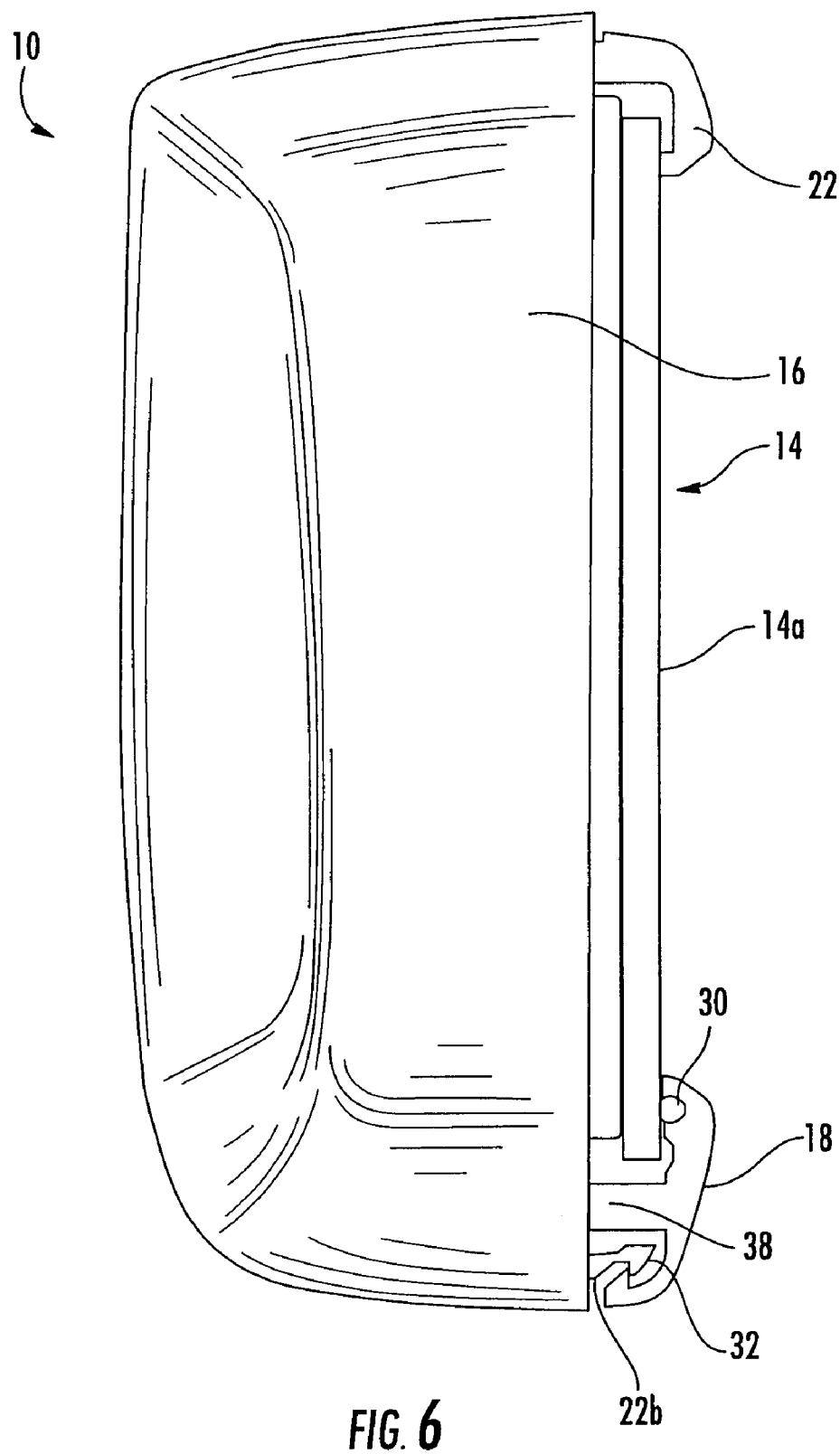
FIG. 6 is a side elevation and partial sectional view of the mirror assembly of the present invention.
Figure 7:
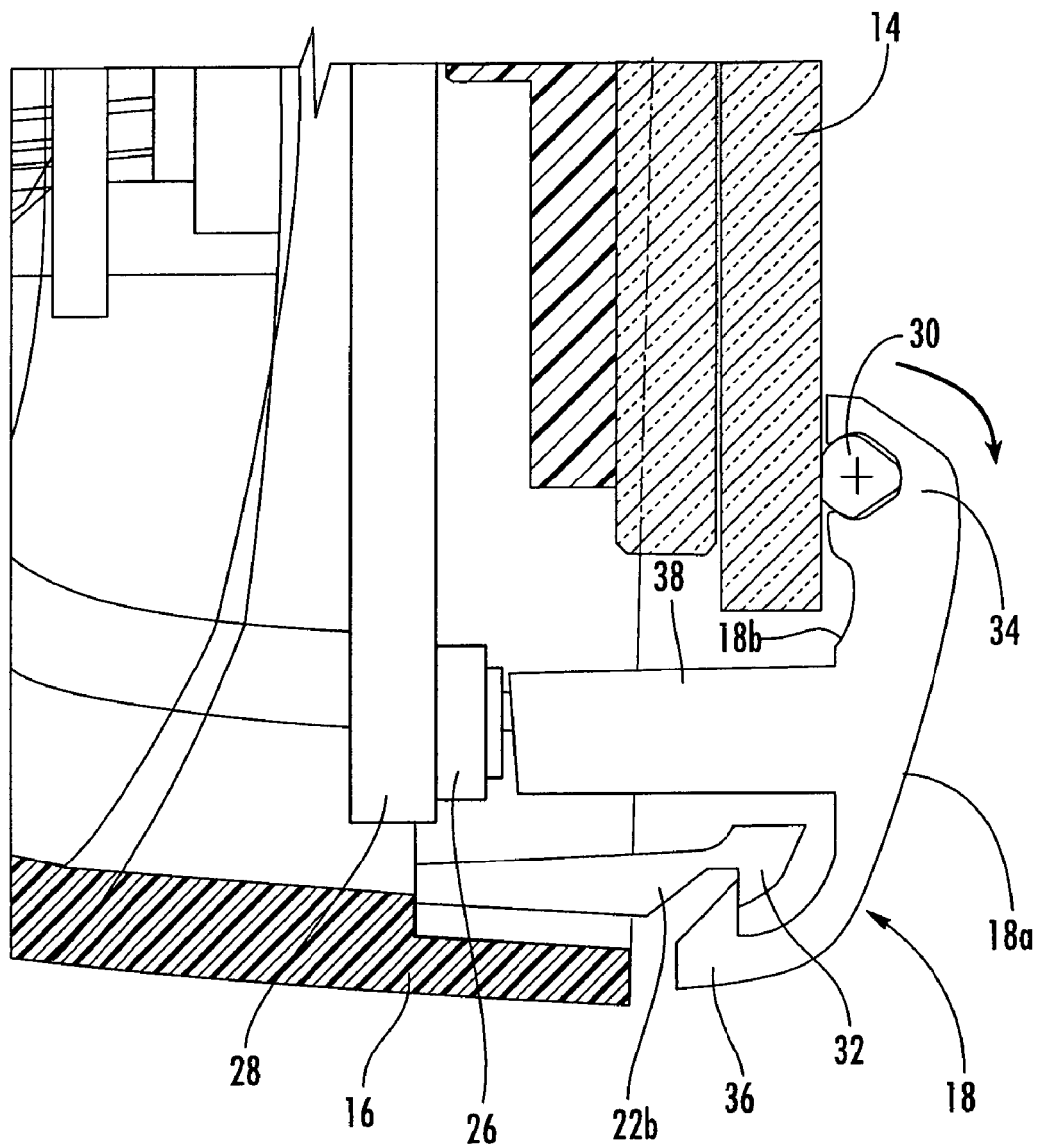
FIG. 7 is an enlarged sectional view of the button region of the mirror assembly of the present invention.
Figure 8:
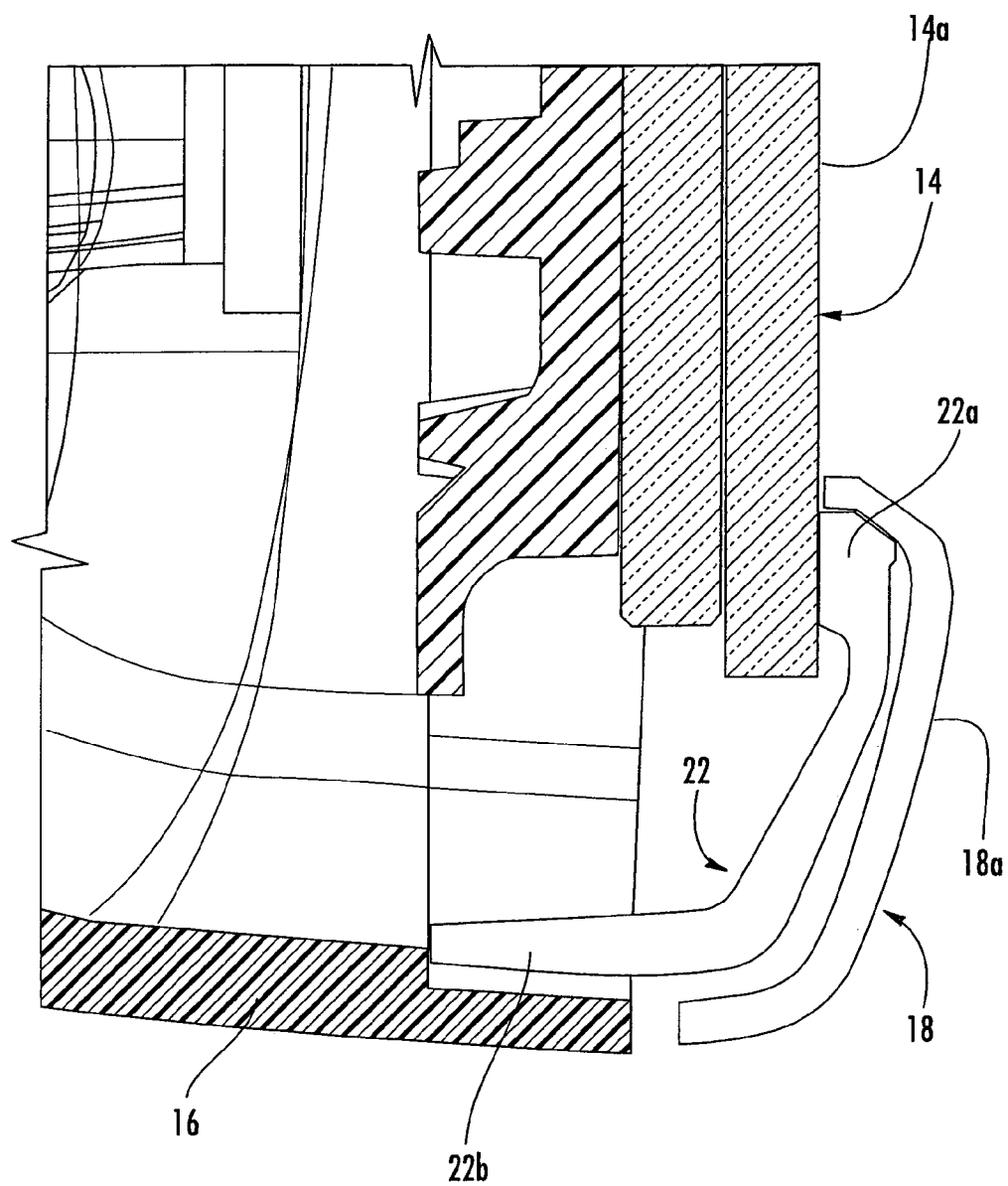
FIG. 8 is another enlarged sectional view of the button region of the mirror assembly of the present invention.
Figure 9:
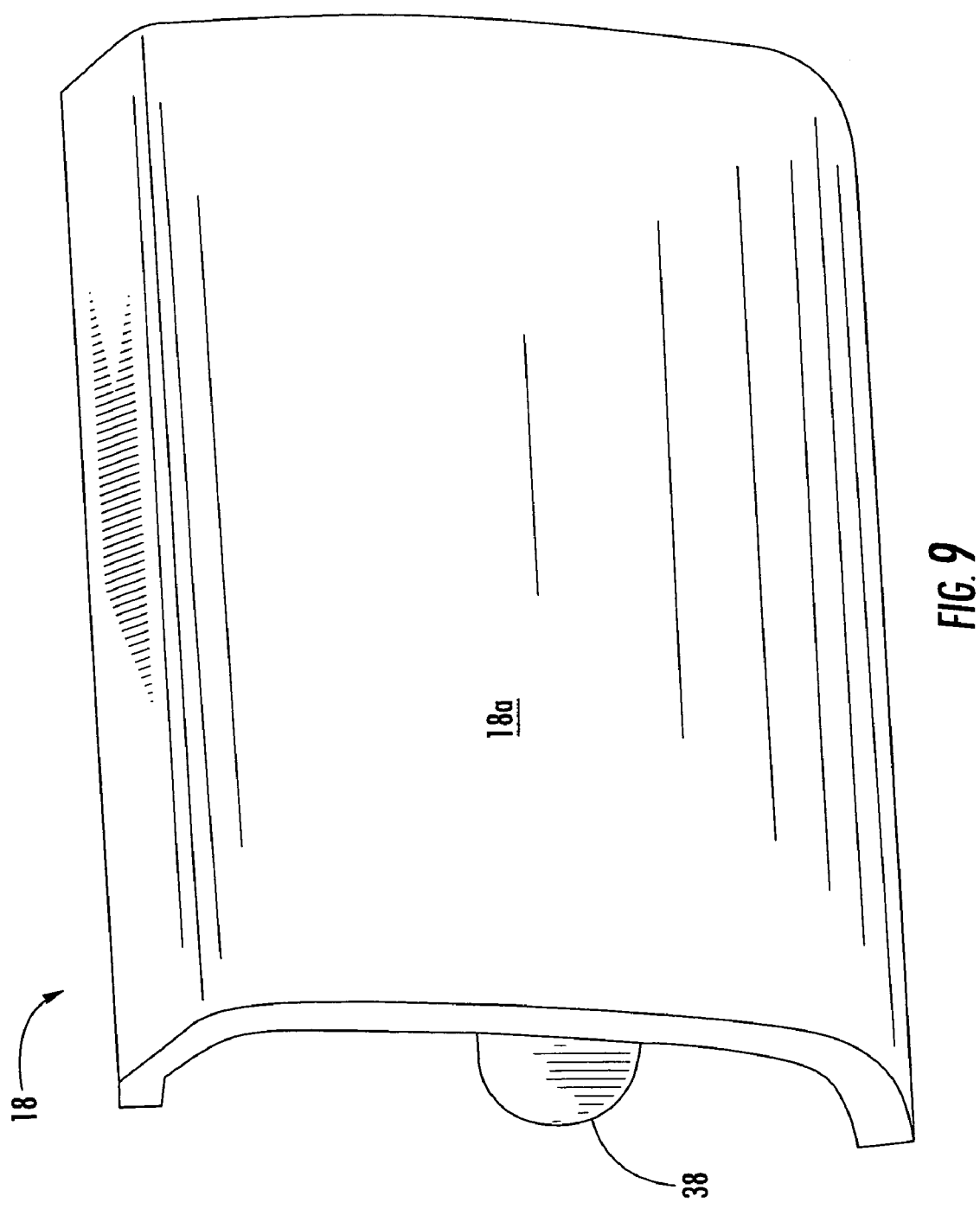
FIG. 9 is an enlarged front perspective view of a button of the present invention.
Figure 17:
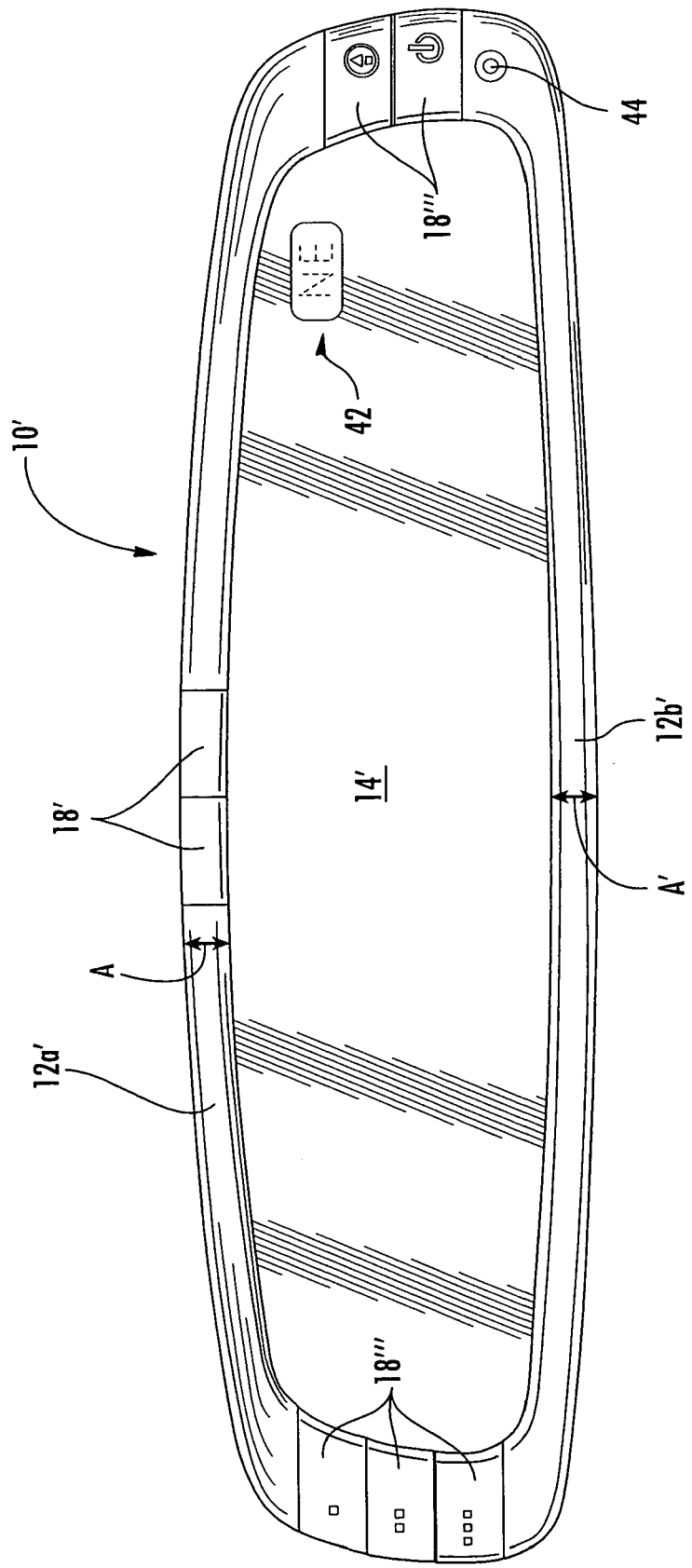
FIG. 17 is a rear perspective view of the mirror assembly with the rear casing removed to show additional details of the interior of the mirror assembly.

As best seen with reference to FIGS. 4-8, mirror assembly may include a frame portion or button mounting portion 22 at least partially along and/or around the perimeter of the reflective element to retain the reflective element at the mirror assembly when the frame portion is secured to the rear casing 16. As shown in FIG. 6, frame portion 22 includes a plurality of apertures 24 spaced along frame portion 22 in the spaces 20 between bezel segments 12a, 12b to provide access for the user input 18 to contact/engage or activate/deactivate electronic switches 26 (FIG. 7) or the like within the mirror assembly 10, such as at a printed circuit board 28 (FIG. 7) within the mirror casing 16 and rearward or behind reflective element 14.

Frame portion 22 includes an upper portion 22a that may extend over a front or first surface 14a (the surface generally facing the driver of the vehicle when the mirror assembly is installed in the vehicle) of the reflective element 14 and may include a lower rearward extending attachment portion 22b for inserting into and/or attaching to the rear casing 16. Frame portion 22 includes a button mounting portion or mounting post or rod 30 that spans the upper region of the apertures 24 and provides a mounting post or rod or portion for pivotally or movably mounting the button or user input 18 thereto. Frame portion 22 may also include a lower button attaching or mounting portion or tab 32 at lower portion 22b for engaging a lower portion of the user input 18 to retain the user input at the frame portion 22 and at least partially along space 20. The frame portion may extend substantially around the perimeter region of the reflective element and may retain the reflective element therein or thereat, or may attach to the reflective element or mirror assembly (such as to a backing plate of the reflective element or other portion of the mirror assembly) at the space or gap created between the bezel terminal ends. Optionally, the frame portion may utilize aspects of the support elements described in U.S. patent application, Ser. No. 11/226,628, filed Sep. 14, 2005; and/or U.S. provisional applications, Ser. No. 60/677,990, filed May 5, 2005; and Ser. No. 60/653,787, filed Feb. 17, 2005, which are all hereby incorporated herein by reference in their entireties.

As best seen with reference to FIGS. 7-10, each user input 18 may comprise an elongated button that has an outer curved surface 18a that generally or substantially corresponds to the shape of the bezel portion along the respective perimeter region of the reflective element 14. User inputs 18 include a post receiving portion 34 at a rearward or inner surface 18b for receiving a respective mounting post or portion 30 at frame portion 22 to pivotally mount the user input to the frame portion 22. User inputs 18 also include a lower retaining tab 36 that engages the lower tab 32 of frame portion 22 to further retain the user input to the frame portion 22. A button or switch engaging or contacting element or post or extension 38 extends from rearward surface 18b of user input 18 and inserts through a respective aperture 24 when user input 18 is mounted to frame portion 22 for contacting or engaging or actuating the electronic switch 26 positioned thereat.

As shown in FIG. 10, the user input or button may include a pair of post receiving portions or snaps 34 for receiving respective posts 30 to attach the button or input to the frame portion. As can be seen with reference to FIGS. 7 and 10, the posts 30 and the post receiving portions 34 are generally non-cylindrical, so that the button may provide a click or haptic feedback to the user when the button is pivoted about the posts 30. The user input 18 may include a single switch contacting extension 38 generally below one of the post receiving portions 34. Optionally, the user input may include a thin-walled central region 40 (FIG. 10) to allow for backlighting of the user input via an illumination source (such as a light emitting diode (LED) or organic light emitting diode (OLED) or the like at the circuit board and generally behind the central region 40) to provide a backlit user input to enhance visibility or viewability or discernibility of the user input, particularly in low-light conditions.

Accordingly, frame portion 22 provides a mounting area for mounting or attaching one or more user inputs along a perimeter region of the reflective element. The frame portion may partially receive the reflective element and may attach to the rear casing of the mirror assembly. The bezel segments may attach along the reflective element and/or the bezel terminal ends may attach to the frame portion (the bezel segments may snap onto the frame portion or may be formed with the frame portion) at and along the desired locations to define the desired spaces between the bezel terminal ends of the bezel segments for the user inputs. The user inputs are pivotally mounted to the frame portion along the spaces between the bezel terminal ends of the bezel segments (and may be readily snapped in place at the frame portion) and may be readily accessed and depressed and pivoted by a user to actuate the respective or associated electrical switch at the circuit board of the mirror assembly to control or activate/deactivate the associated electronic accessory or device or display or the like. The user inputs or buttons may comprise push buttons or rocker buttons or other types of buttons or switches, or may comprise touch sensors or a touch panel or the like.

Thus, and as can be seen with reference to FIG. 5, the terminal ends 13a, 13b of bezel segments 12a, 12b are spaced apart so as to define the gap where no bezel is present. Although the frame portion 22 is described above as extending at least partially around the perimeter of the reflective element, the frame portion or button mounting portion may comprise a bracing element or strut that is positioned at the gap and joins or connects between the bezel terminal ends 13a, 13b. The bracing structure or element may be attached to the reflective element and/or the bezel terminal ends and/or mirror assembly between the bezel terminal ends to provide a mounting structure for mounting or attaching the buttons or inputs to the mirror assembly. Optionally, the bracing element or structure may attach to and/or extend from a backing plate or the like of the reflective element and thus may be positioned at the appropriate reflective element perimeter region as the backing plate is attached to the rear surface of the reflective element. The bracing element or structure thus includes structure or elements for providing movement or articulation or actuation of the buttons after the buttons are mounted to or snapped to the bracing element.

Optionally, the inputs or buttons may be pre-assembled to the bracing element or to another mounting structure that may attach to the mirror assembly, such as to a backing plate or portion of a backing plate or the like, so that the user inputs are provided to the mirror manufacturer as a user input or button module or block. The module or block thus may be readily snapped or otherwise attached to the mirror assembly at the space between the bezel terminal ends to provide the user inputs or buttons at the perimeter region of the reflective element. The bezel or bezel segments thus may be provided to the mirror manufacturer separately from the user inputs, and the segments and user input block may be readily attached to or positioned at the reflective element and/or mirror assembly. The snap-on user input module or block may include the bracing element and the user inputs or buttons, and may also include illumination sources (such as LEDs or the like) for backlighting the inputs, and may include other circuitry or the like that is readily connected to circuitry of the mirror assembly as the bracing element is snapped or attached to the reflective element or mirror assembly. For example, the illumination sources or circuitry may include leads or connectors that extend from a rear portion of the button or the bracing element so that they contact circuitry at a printed circuit board or the like of the mirror assembly as the module is attached to the reflective element or mirror assembly.

Optionally, and with reference to FIG. 11, the user inputs 18''' of interior rearview mirror assembly 10' may be positioned along other perimeter regions of the reflective element 14' and frame portion, such as along the side perimeter regions of the reflective element and between upper and lower bezel portions 12a', 12b'. The user inputs thus may be readily accessible by a user at the side regions of the mirror assembly. Mirror assembly 10' and user inputs 18''' may be substantially similar to mirror assembly 10 and user inputs 18, discussed above, such that a detailed discussion of the mirror assemblies will not be repeated herein. The similar or common components or elements are referenced with similar reference numbers in the Figures. Optionally, and as shown in FIG. 12, other types of user inputs 118 may be positioned along the side perimeter regions of a reflective element 114 of interior rearview mirror assembly 110 for access by a user at the side regions of the mirror assembly.

Figure 13:
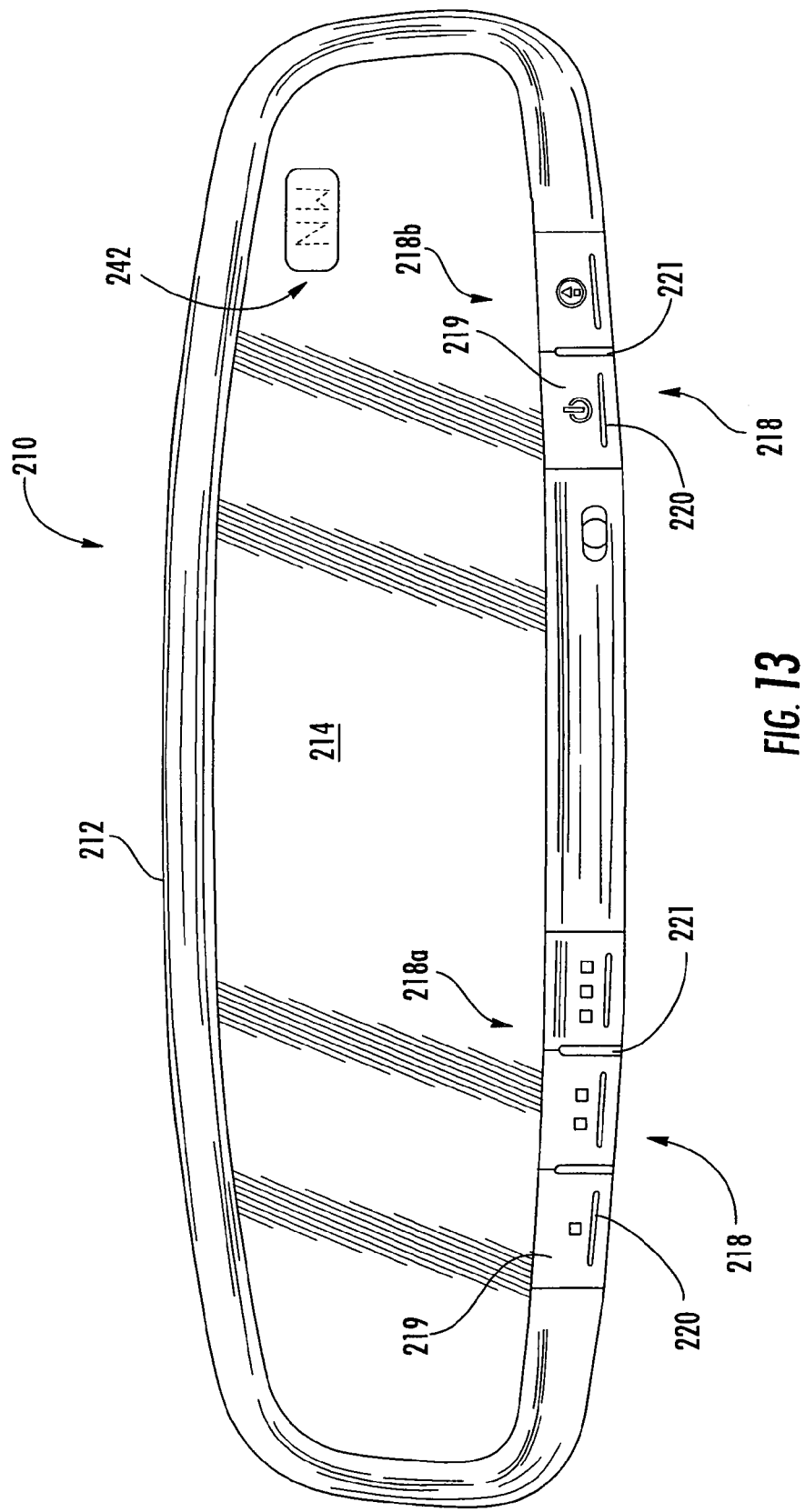
FIG. 13 is a front elevation of another interior rearview mirror assembly in accordance with the present invention.
Figure 13A:
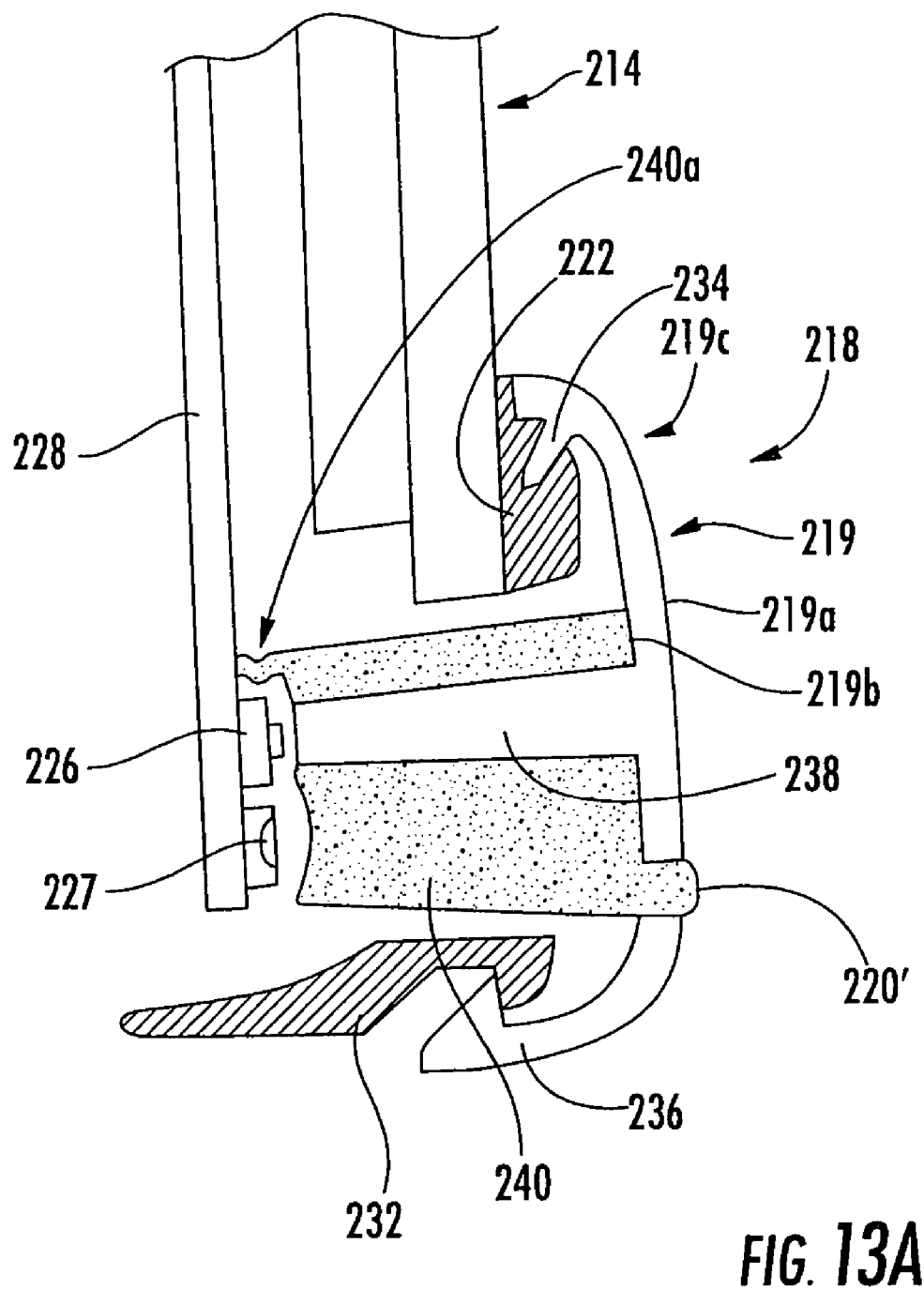
FIG. 13A is a sectional view of a button suitable for use with the mirror assembly of FIG. 13.

Optionally, and with reference to FIGS. 13 and 13A, an interior rearview mirror assembly 210 for a vehicle includes a bezel portion 212 and a mirror reflective element 214 positioned at the bezel portion 212. Mirror assembly 210 includes or is associated with an electronic accessory or device or circuitry or display (such as a temperature or directional indicating display 242 or the like), and includes one or more user inputs or buttons or switches 218 positioned along a perimeter region of the reflective element 214 for activating/deactivating and/or controlling the electronic accessory. Adjacent inputs or buttons 218 are separated by a respective divider 221, which may comprise a portion of the frame portion 222 or may be otherwise positioned or located between the inputs or buttons 218. The dividers 221 function to limit or substantially preclude accidental or unintentional actuation or pressing of two inputs or buttons at the same time by a user. Also, the inputs or buttons 218 may include a rib or other haptic/tactile/texture structure or element 220 for easier "no-look" switch finding. The rib or other structure/element/texture assists a user in actuating the buttons by guiding the user's finger so that the user presses in the appropriate area of the switch. The inputs/buttons 218 and mirror assembly may otherwise be substantially similar to the inputs and mirror assemblies discussed above, such that a detailed discussion of the inputs and mirror assemblies will not be repeated herein.

In the illustrated embodiment of FIG. 13, one set of inputs 218a are provided for controlling a universal garage door opening system, such as a vehicle-based garage door opening system of the types described in U.S. Pat. Nos. 6,396,408; 6,362,771; and 5,798,688, and/or U.S. patent application Ser. No. 10/770,736, filed Feb. 3, 2004, now U.S. Pat. No. 7,023,322; and/or U.S. provisional applications, Ser. No. 60/502,806, filed Sep. 12, 2003 by Taylor et al. for GARAGE DOOR OPENING SYSTEM FOR VEHICLE; and Ser. No. 60/444,726, filed Feb. 4, 2003 by Baumgardner et al. for GARAGE DOOR OPENING SYSTEM FOR VEHICLE, which are hereby incorporated herein by reference in their entireties. Another input or set of inputs 218b may be provided to control or adjust other accessories or displays of the mirror assembly. For example, the inputs may activate/deactivate/control/adjust a display or other accessory of or associated with the mirror assembly, and/or may adjust or control or select a display function, such as a "compass" function or a "temperature" function or such as a "units" (for example, metric or imperial) selection or display or the like.

Optionally, and with reference to FIG. 13A, each user input 218 may comprise an elongated button portion 219 that has an outer curved surface 219a that generally or substantially corresponds to the shape of the bezel portion along the respective perimeter region of the reflective element 214. User input 218 also includes a button or switch engaging or contacting or actuating element or post or extension 238 extending from the rear surface 219b of button portion 219 for actuating a button or switch 226 at the printed circuit board (PCB) 228. User input 218 is mounted to the frame portion 222, such as via a post receiving portion and mounting post or the like, such as described above. In the illustrated embodiment of FIG. 13A, user input 218 includes a mounting element or extension 234 at the rearward or inner surface 219b of button portion 219 that is received within a respective mounting receiver or slot formed or established at or in frame portion 222, whereby the upper region 219c of button portion 219 may flex to allow button 219 and actuating post 238 to actuate the electronic switch 226. User input 218 also includes a lower retaining tab 236 at a lower region of button portion 219 that engages the lower tab 232 of frame portion 222 to further retain the user input to the frame portion 222.

Optionally, and as shown in FIG. 13A, an illumination source 227 (such as a light emitting diode (LED) or the like) may be provided at the printed circuit board 228 and may be operable to illuminate a portion of user input 218 to ease viewing and discerning of the user input by the driver or occupant of the vehicle during low lighting conditions, such as at nighttime. The user input 218 may include a translucent or partially translucent element or elastomeric element 240, such as a silicone element or the like, positioned between the illumination source 227 and an illuminatable or back lightable portion (such as a window or translucent portion or opening or aperture) of the button portion or component. In the illustrated embodiment, the translucent element 240 of user input 218 is located at the rear surface of the button portion 219 and at least partially around the actuating post 238. The translucent or elastomeric element 240 may be pressed into position around the actuating post or may be molded around the actuating post without affecting the scope of the present invention. Translucent element 240 includes a rib portion 220' that protrudes through a slot or opening or aperture in the button portion 219 so as to provide a protrusion or rib along the front surface of the button. The translucent element or silicone or elastomeric element 240 preferably functions to guide light (such as by transmission or reflection or otherwise) from the illumination source 227 to the rib portion 220' so that the rib portion 220' is illuminated or partially illuminated or back lit by the illumination source 227.

As also shown in FIG. 13A, the silicone element 240 may also include a flexible spring leg or member 240a that extends toward and into engagement with the printed circuit board 228 (or other structural element within the mirror assembly and generally behind the user input 218). The flexible leg 240a may flex when pressed against the circuit board or other structure and may be biased toward its initial position or orientation so as to provide a spring action to assist in button return (after depression or actuation of the button). The translucent element and spring leg may also provide an anti-rattle function or feature to the user input and mirror assembly. The translucent element 240 thus may provide a backlighting feature and a finger locator rib to assist in viewing and discerning and actuating the user input in low lighting conditions. Optionally, the locator rib or rib portion 220' of silicone element 240 may provide a soft touch feature, such as by utilizing aspects of the soft touch elements described in U.S. Pat. No. 6,318,870, which is hereby incorporated herein by reference in its entirety. Optionally, the translucent or elastomeric element may comprise a substantially non-translucent elastomeric or rubber material and may provide an anti-rattle function and/or a soft touch rib or rib portion at the button, without also providing a light guiding or back lighting feature at the user input or button.

The elastomeric element or component of the user input of the present invention thus may attach to or be formed integral with the button component, and may protrude or partially protrude through the button to form the rib or finger locator feature or "no-look" feature at the front surface of the button component. The back or inward portion of the elastomeric element extends toward the circuit board level and may have flexible features or elements or portions that engage the printed circuit board (or other structure) to act as a spring. Optionally, the translucent or elastomeric element may provide a backlighting guide to backlight the protruding rib. The user inputs or buttons thus may have just the rib backlit (and not the icons or other portions of the button) so that the backlighting is not too "busy" or intrusive for night driving, but sufficiently functions to indicate where the buttons are located at the mirror assembly.

Optionally, the surface or finish of the user inputs may have a brushed or polished metallic finish or appearance (such as shown in FIG. 11) or a chrome appearance or a color or the like, if desired. It is further envisioned that, since the user inputs are readily snapped onto the frame portion of the mirror assembly and may be snapped onto the frame portion after the mirror assembly is otherwise assembled, the user inputs or buttons may be provided in a variety of colors and/or with a variety of markings or indicia thereon, so that the user inputs may be selected by the customer to provide a customized or personalized appearance to the mirror assembly, such as by utilizing aspects of the mirror assemblies described in U.S. pat. applications, Ser. No. 11/021,065, filed Dec. 23, 2004, now U.S. Pat. No. 7,255,451; and/or Ser. No. 10/556,754, filed Nov. 15, 2005, now U.S. Pat. No. 7,289,037; and PCT Application No. PCT/US04/15424, filed May 18, 2004, and published Dec. 2, 2004 as International Publication No. WO 2004/103772, which are hereby incorporated herein by reference in their entireties.

The frame portion and/or bezel portion may attach to the rear casing to assemble the reflective element to the rear casing. The rear casing may comprise any type of mirror casing and may house or contain electronic circuitry therein. Optionally, the rear casing portion comprise a plastic molded cap or cap portion, such as the types described in U.S. patent application Ser. No. 10/556,754, filed Nov. 15, 2005, now U.S. Pat. No. 7,289,037; and U.S. provisional applications, Ser. No. 60/471,546, filed May 19, 2003; Ser. No. 60/525,537, filed Nov. 26, 2003; and Ser. No. 60/556,259, filed Mar. 25, 2004, and in PCT Application No. PCT/US04/15424, filed May 18, 2004, and published Dec. 2, 2004 as International Publication No. WO 2004/103772, which are hereby incorporated herein by reference in their entireties.

The button or switch or user input may be printed or screened with the desired color or pattern of colors (or may be substantially transparent or translucent in areas where no color is printed) to provide the desired appearance for the user input. An organic or inorganic light-emitting diode (LED or OLED) or electroluminescent light-emitting (EL; organic or inorganic) junction or element or multiple such elements can be included and located at, or disposed at/behind a particular button, such that successful actuation of a vehicular accessory or feature/function can be indicated to the person pressing the button by that local LED or EL (or any other light-emitting means) indicator element illuminating (and correspondingly, when that particular button is next pressed to turn off that vehicular accessory or feature/function, success may be indicated by the indicator light associated with that particular button turning off).

Any associated back-lighting indicator can have relatively low light emission so that it merely causes that button or a portion thereof to glow at night and so be readily discernible to the driver or to any other occupant of the vehicle without causing any glaring or detrimental effect on the driver's night vision (even if such weak illumination is washed out during daylight, the driver can discern the membrane switch during daytime hours by its distinctive appearance). Note, and optionally, a photo sensor control (such as via a photo transistor or photo diode or photo resistor sensor with allied electrical circuitry) can be included in the mirror assembly or in the vehicle to reduce the intensity emitted by any light-emitting indicator of the user input or button when driving under low ambient conditions such as at dusk or night (less than 200 lux or thereabouts, for example).

Figure 16A:
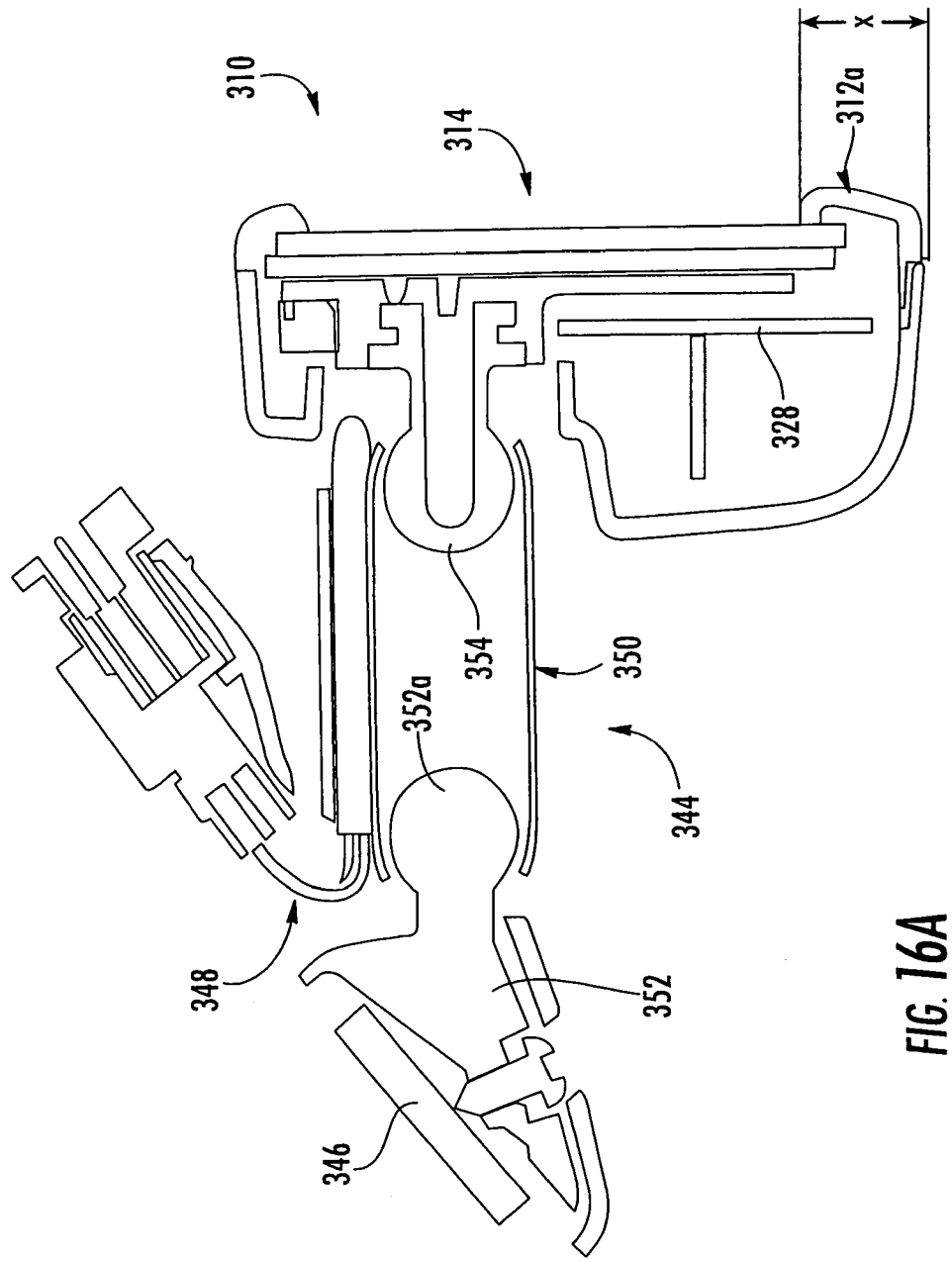
FIG. 16A is a sectional view of the mirror assembly taken along the line A-A in FIG. 16.
Figure 16B:
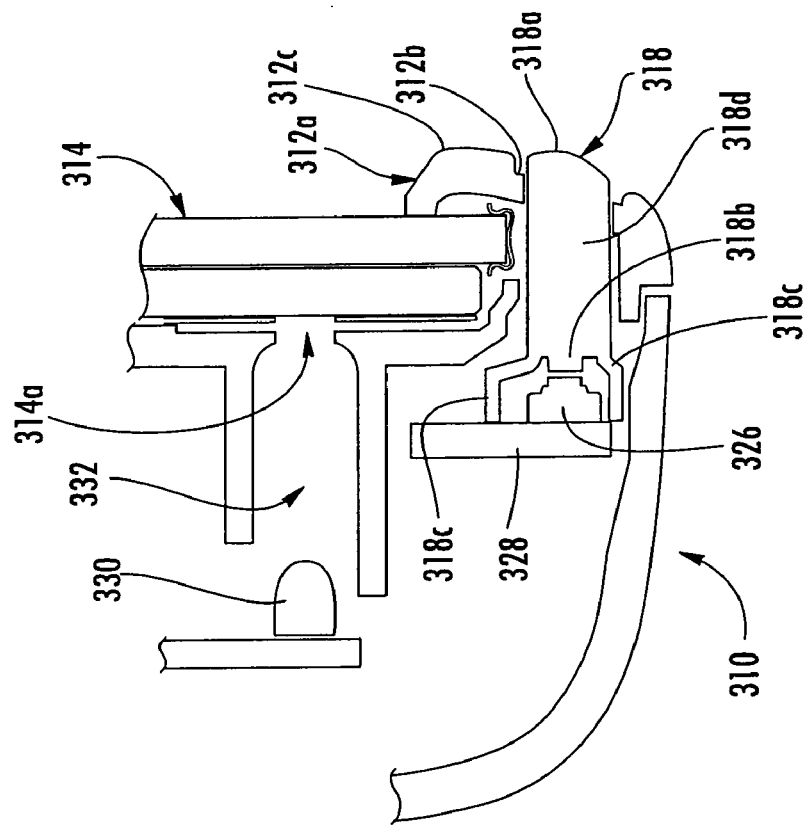
FIG. 16B is an enlarged sectional view of a portion of the mirror assembly taken along the line B-B in FIG. 16.
Figure 18:
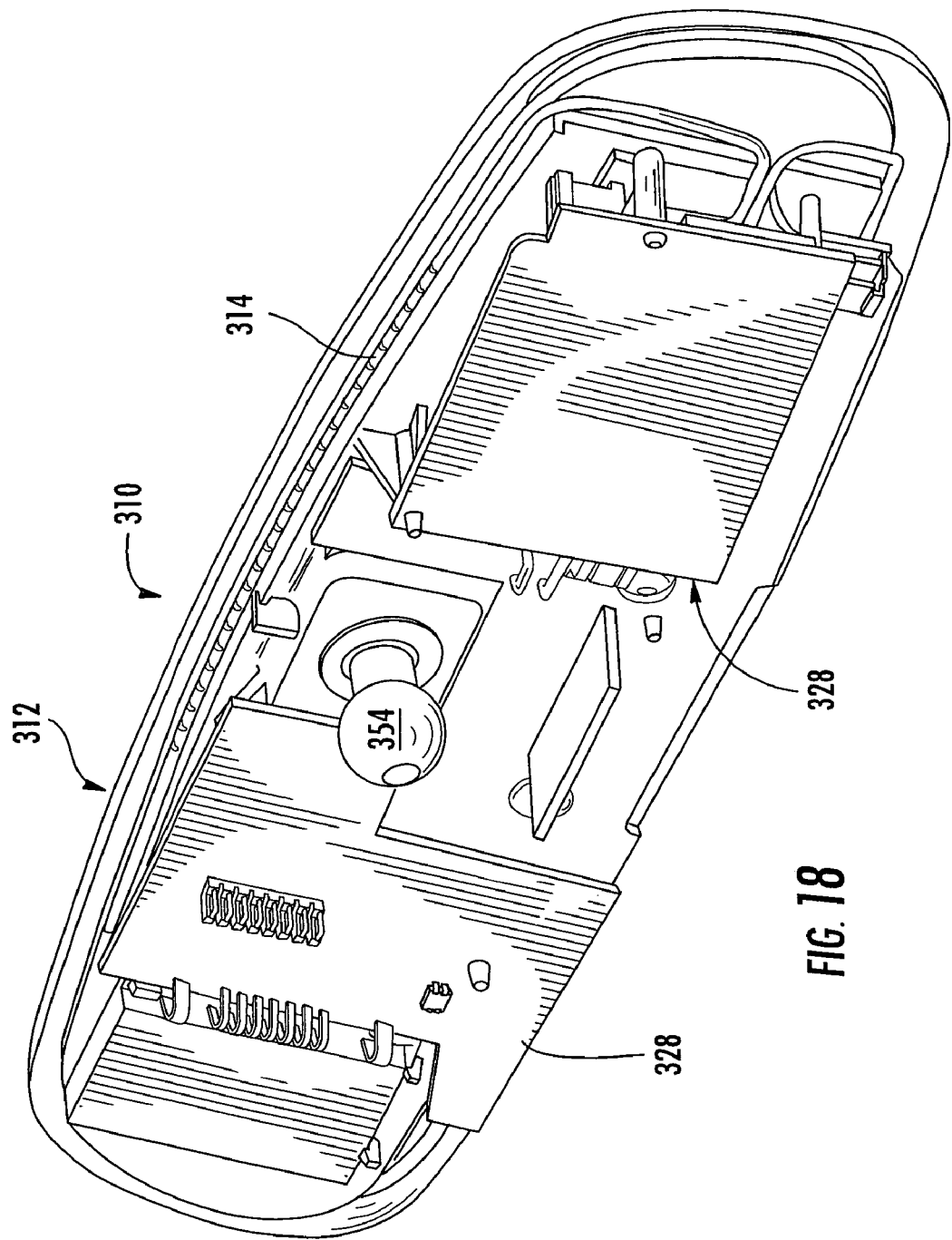
FIG. 18 is another rear perspective view of the mirror assembly of the present invention.

Optionally, and with reference to FIGS. 16 and 18, an interior rearview mirror assembly 310 for a vehicle includes a bezel portion 312 and a mirror reflective element 314 positioned at the bezel portion 312 that is associated with the mirror casing or housing. Mirror assembly 310 includes or is associated with an electronic accessory or device or circuitry or display (such as a temperature or directional indicating display 342 or the like), and includes one or more user inputs or buttons or switches 318 positioned along a perimeter region of the reflective element 314 and at a lower bezel portion 312a for activating/deactivating and/or controlling the electronic accessory. As can be seen with reference to FIGS. 16A and 16B, the inputs or buttons 318 are sized so as to have a lower vertical profile relative to the lower bezel portion 312a, and may extend below the reflective element between the lower bezel portion 312a and an electronic switch or button 326 at a printed circuit board or element 328 (FIG. 16B) of the mirror assembly.

The lower bezel portion 312a thus may have a slot or aperture formed therethrough for at least partially receiving the buttons or inputs 318 therethrough. In the illustrated embodiment, the lower bezel portion 312a includes a recessed surface 312b at or surrounding the aperture or slot and the input or button 318 has an outer portion or surface 318a that protrudes beyond the recessed surface 312b (and optionally beyond the outer surface 312c of lower bezel portion 312a) so that the outer portion of the input 318 is readily felt and actuated or depressed by a user. Adjacent inputs or buttons 318 may be separated by a divider portion 321, which may comprise a portion of the lower bezel portion 312a or may comprise a separate divider element positioned between the adjacent inputs or buttons and generally fixedly positioned relative to the bezel portion 312a. The divider portions 321 function to limit or substantially preclude accidental or unintentional actuation or pressing of two inputs or buttons at the same time by a user. The inputs/buttons 318 and mirror assembly may otherwise be substantially similar to the inputs and mirror assemblies discussed above, such that a detailed discussion of the inputs and mirror assemblies will not be repeated herein.

As shown in FIG. 16B, input 318 includes a body portion 318d that extends below the reflective element 314 to the outer surface of the lower bezel portion and a switch actuating portion 318b for engaging and actuating or depressing the respective electronic switch 326 at the printed circuit board 328. The input 318 may include a haptic/tactile element 318c (such as flexible legs or elements that extend from the body portion 318d) that provide the desired feedback (such as a click or the like when depressed) to the user when the button or input is depressed by a user and that provides the desired bias to return the button to its initial position after actuation and release of the button by a user.

Figure 16C:
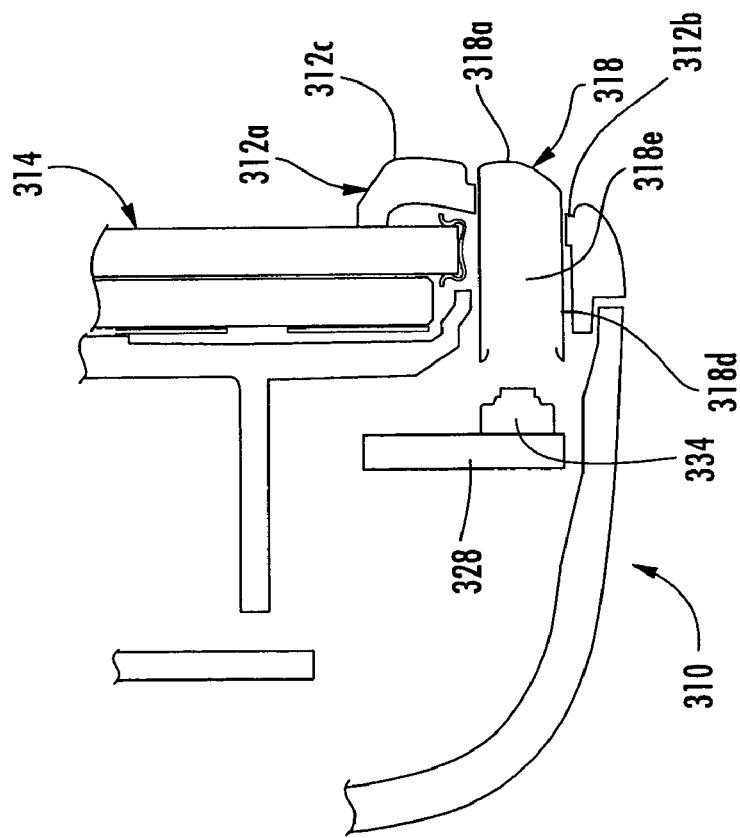
FIG. 16C is an enlarged sectional view of a portion of the mirror assembly taken along the line C-C in FIG. 16.
Figure 17:
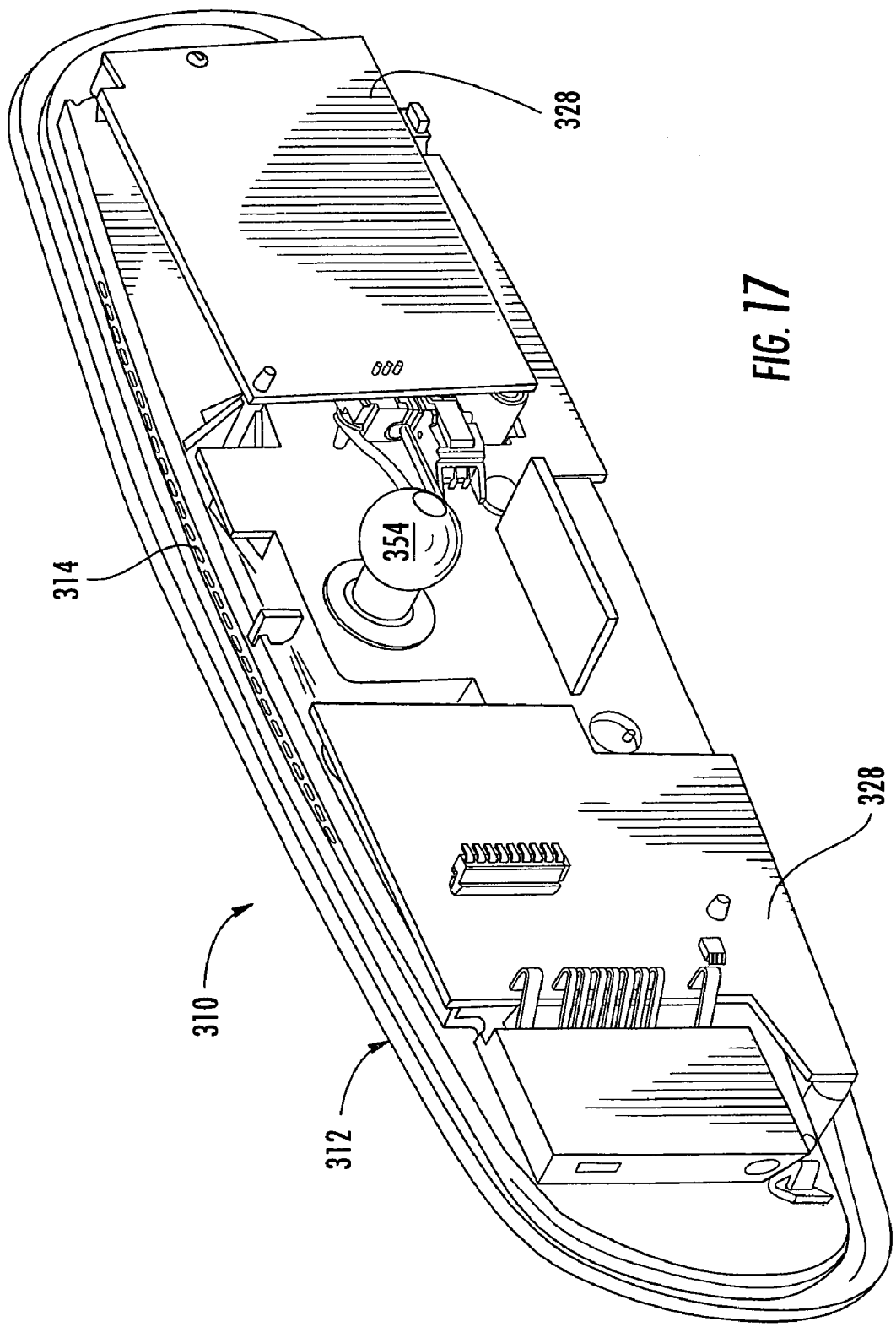

Mirror assembly 310 may include an illumination source 330, which may be located at the printed circuit board and generally aligned with a passageway 332 at a window or display area or indicator area 314a at the reflective element 314. The illumination source 330 may provide an indication of successful actuation of the input or button, such as to provide feedback to the user to confirm actuation of the accessory or the like, and/or may backlight an icon or character or indicia formed or established at the reflective element. Optionally, and as shown in FIG. 16C, body portion 318d of input or button 318 may be partially hollow and/or may include a passageway 318e and may be generally located at an illumination source 334, such as a light emitting diode or the like, at the printed circuit board 328. The illumination source 334 may project illumination into input 318 to provide illumination at the outer surface 318a of input 318, such as by backlighting the outer surface of the input (which may be at least partially or substantially translucent to allow light to pass therethrough). The illumination source 334 may be actuated to provide a feedback to the user to confirm successful actuation of the user input, or may be actuated in connection with or in response to an ambient light detector or sensor, whereby the illumination source may be activated to illuminate or backlight the input when the ambient light level is reduced, such as at nighttime or the like.

The user actuatable inputs or buttons 318 of the present invention thus provide low profile inputs along the bezel portion of the mirror assembly, such as a profile of about half the vertical profile or height of the lower bezel portion. For example, and as shown in FIG. 16A, bezel portion 312a may have a vertical cross-dimension of X (such as, for example, about 14 mm or thereabouts), while the user input or button 318 may have a vertical cross-dimension that is at least less than about 70 percent of X, and more preferably less than about 50 percent of X. The lateral cross-dimension Y (FIG. 16) of the user inputs may be selected depending on the particular application of the inputs and desired appearance of the mirror assembly. For example, the inputs may have a lateral cross-dimension of about 17 mm or thereabouts. Other dimensions for the bezel portion height and button height and width may be selected without affecting the scope of the present invention.

Thus, an embodiment of the present invention includes a rearview mirror that comprises a housing adapted to support a rearview mirror subassembly and a bezel attached to and partially covering a front of the housing and wherein the bezel defines a chin section, and wherein a vertical height dimension of the button is less than about 50 percent of a vertical height of the chin section (more preferably, a vertical height dimension of the button is less than about 33 percent of a vertical height of the chin section; and most preferably, a vertical height dimension of the button is less than about 20 percent of a vertical height of the chin section), but the vertical height dimension of the button is, preferably, greater than about 5 percent of a vertical height of the chin section (more preferably, a vertical height dimension of the button is greater than about 8 percent of a vertical height of the chin section; and most preferably, a vertical height dimension of the button is greater than about 13 percent of a vertical height of the chin section). Preferably, the aspect ratio [i.e., the ratio of the length (a.k.a. the lateral dimension) of the button to its width (a.k.a. the vertical height)] is at least about 3:1; more preferably is at least about 4:1, and most preferably is about 5:1.

Also, and preferably, the button protrudes beyond the surface of the bezel portion so that when the driver or other occupant of the vehicle presses the button to actuate an accessory, it is the button surface that is first touched, and the button bottoms out at the surrounding bezel surface when depressed. Typically the button protrudes by less than about 1.25 mm; more preferably by less than about 0.85 mm, and most preferably by less than about 0.7 mm, but protrudes by at least about 0.1 mm; more preferably by at least about 0.13 mm and most preferably by at least about 0.17 mm.

As can be seen FIG. 16C (where the bezel lacks a chin), the front or first surface 318a of button 318 is generally not flush with the face of the bezel (such as outer surface 312c in FIG. 16C) and protrudes slightly. Preferably, the button actuates a "push-push" electrical switch so that a first push opens (or closes) a switch contact and a second push closes (or opens) that switch contact. Optionally, the button can protrude further from the bezel before being pushed than after pushing so that the user can gain visual and/or tactile indication of switch status by the amount of protrusion of the switch from the bezel. For example, the outer button portion or surface may protrude a first distance from the bezel when the switch contact is closed and may protrude a second distance from the bezel (which may be greater than the first distance) when the switch contact is open.

An exemplary vertical height (dimension "X" as in FIG. 16A) for the bezel portion where a user actuatable button is disposed is about 10 mm to about 16 mm or so (for example, about 14 mm). The vertical height of the four-sided button disposed thereat is preferably about 2.75 mm to about 4.85 mm (for example, 4.1 mm) such that the button vertical height is typically in the range of about 17 percent to about 48 percent of the vertical height of the bezel portion where the button is disposed (preferably, less than 40 percent). For example, we find that a 4.1 mm vertical height button when disposed at a 14 mm vertical height bezel portion (thus the button width dimension is about 29 percent the width of the bezel portion) works well as a user interface button. The length dimension (dimension "Y" as in FIG. 16) of such a button is preferably in the about 15 mm to about 20 mm or thereabouts range. For example, we find that a button that is 17 mm long and 4.1 mm wide (and thus has an aspect ratio of about 4:1 or thereabouts) works well when disposed at a 14 mm width bezel section and with the button protruding beyond the bezel section so as to be first contacted by a user touching that region of the mirror bezel and with the button length dimension running transverse or along the bezel portion.

The inputs 318 thus protrude from respective recessed areas at the lower bezel portion so that a user may readily feel and discern the inputs when attempting to actuate an input or button. The inputs or buttons are movable toward and into contact/engagement with the electronic switch at the printed circuit board when actuated, and the user may press the input inward until the user's finger contacts or "bottoms out" at the outer surface of the bezel portion, thereby confirming to the user that the button or input is fully depressed or actuated. Although shown and described as being along a lower bezel portion of the mirror assembly, the user inputs may be located at any other area around the bezel portion of the mirror assembly, such as at the sides of the bezel portion or at the upper bezel portion of the mirror assembly, without affecting the scope of the present invention.

As can be seen in FIG. 16A, the mirror assembly 310 may include a mounting assembly 344 for pivotally or adjustably mounting the mirror assembly to an interior portion of a vehicle, such as to a mounting button 346 or the like at an interior surface of the vehicle windshield. A wiring harness 348 may be routed along the support arm 350 of the mounting assembly and may connect to a connector of the mirror assembly, such as through an opening in the rear casing of the mirror assembly, and may connect to a vehicle wire harness at the headliner or overhead console of the vehicle so as to provide electrical connection between the vehicle wire harness and the mirror assembly. The mounting assembly 344 may include wire management features, and may utilize aspects described in U.S. pat. application Ser. No. 11/226,628, filed Sep. 14, 2005 by Karner et al.; and/or U.S. provisional application, Ser. No. 60/729,430, filed Oct. 21, 2005, which are hereby incorporated herein by reference in their entireties, in order to route the wire harness 348 from the mirror assembly to the vehicle wire harness. Optionally, the wire harness 348 may route through the support arm 350, such as by utilizing aspects described in U.S. patent application Ser. No. 11/226,628, filed Sep. 14, 2005 by Karner et al., which is hereby incorporated herein by reference in its entirety. The support arm 350 may pivotally attach at one end to a mounting base or channel mount 352 and associated ball member 352a at the windshield (or other interior portion of the vehicle) and may pivotally attach at the other end to a ball member 354 at the reflective element 314 and mirror head of the mirror assembly, thus providing a double ball mounting arrangement for the mirror assembly.

In the illustrated embodiment of FIGS. 1 and 2, the user inputs or buttons may comprise user inputs for a garage door opening system, such as a vehicle based garage door opening system of the types described in U.S. Pat. Nos. 6,396,408; 6,362,771; and 5,798,688, and/or U.S. patent application Ser. No. 10/770,736, filed Feb. 3, 2004, now U.S. Pat. No. 7,023,322; and/or U.S. provisional applications, Ser. No. 60/502,806, filed Sep. 12, 2003 by Taylor et al. for GARAGE DOOR OPENING SYSTEM FOR VEHICLE; and Ser. No. 60/444,726 filed Feb. 4, 2003 by Baumgardner et al. for GARAGE DOOR OPENING SYSTEM FOR VEHICLE, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. As shown in FIG. 1, the mirror assembly 10 may include a display 42 for displaying a compass heading at the reflective element. The display may comprise a display-on-demand transflective display or other types of display as described below. Optionally, the user inputs may also or otherwise comprise user inputs for a telematics system of the vehicle (such as an ONSTAR® system as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; and/or 6,678,614; and/or U.S. pat. applications, Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/964,512, filed Oct. 13, 2004, now U.S. Pat. No. 7,308,341; and Ser. No. 10/422,378, filed Apr. 24, 2003 by Schofield for IMAGING SYSTEM FOR VEHICLE, now U.S. Pat. No. 6,946,978; and/or PCT Application No. PCT/US03/40611, filed Dec. 19, 2003 by Donnelly Corporation et al. for ACCESSORY SYSTEM FOR VEHICLE, and published Jul. 15, 2004 as International Publication No. WO 2004/058540, and/or PCT Application No. PCT/US03/308877, filed Oct. 1, 2003 by Donnelly Corp. for MICROPHONE SYSTEM FOR VEHICLE, and published Apr. 15, 2004 as International Publication No. WO 2004/032568, which are all hereby incorporated herein by reference in their entireties).

Figure 19:
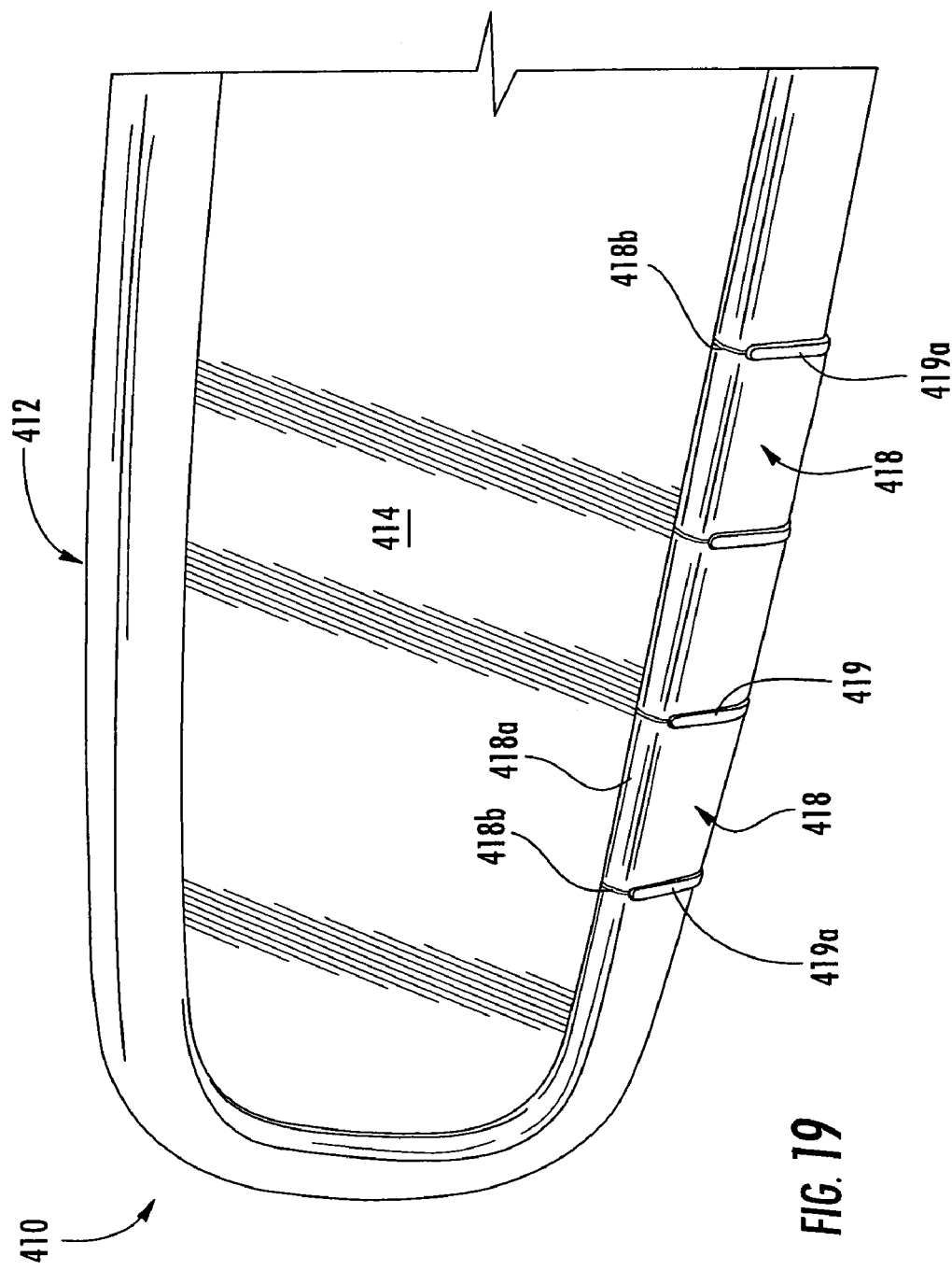
FIG. 19 is a perspective view of another mirror assembly in accordance with the present invention, with user actuatable inputs being integral with a bezel portion of the mirror assembly.
Figure 20:
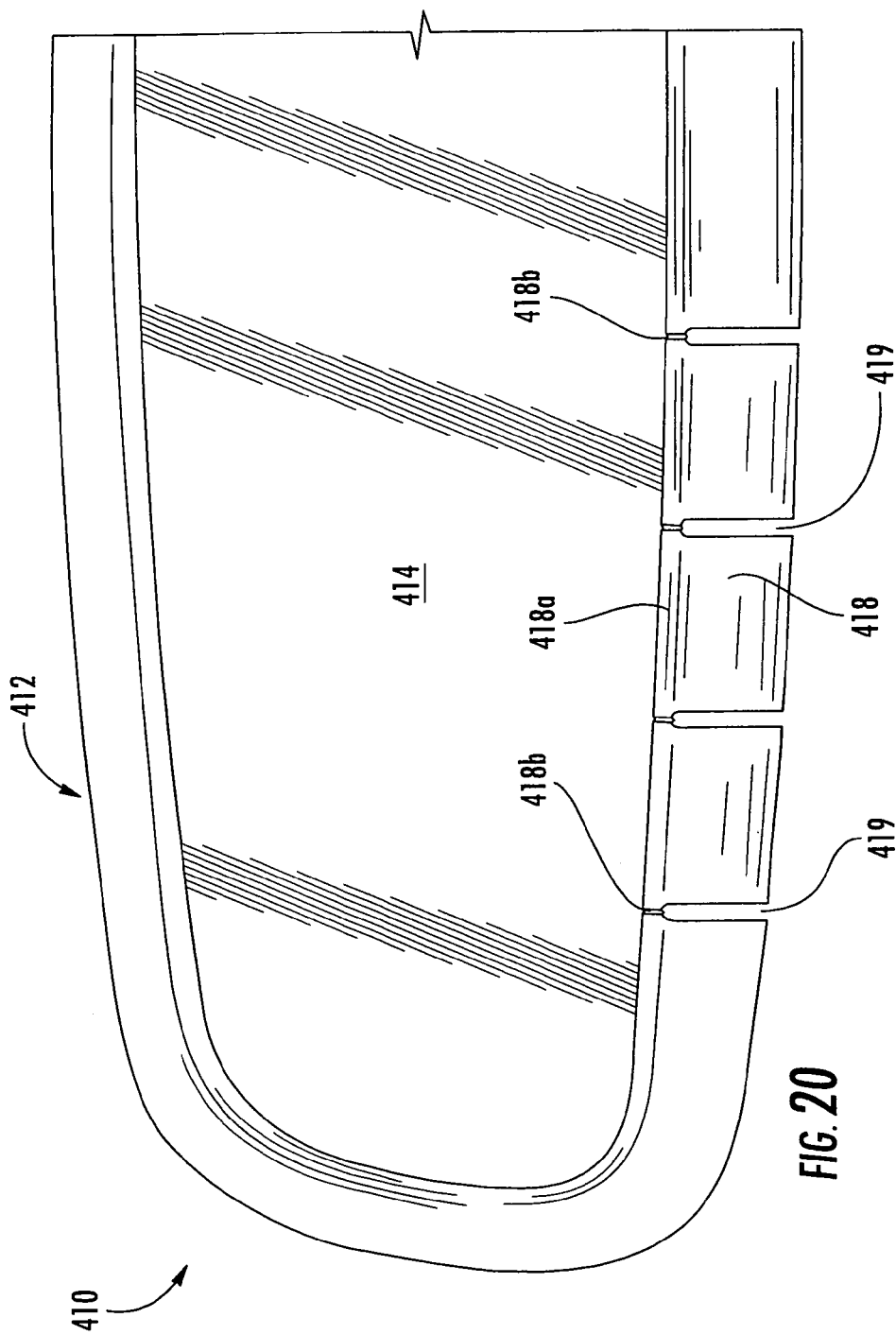
FIG. 20 is a front plan view of the bezel portion of the mirror assembly of FIG. 19.
Figure 21:
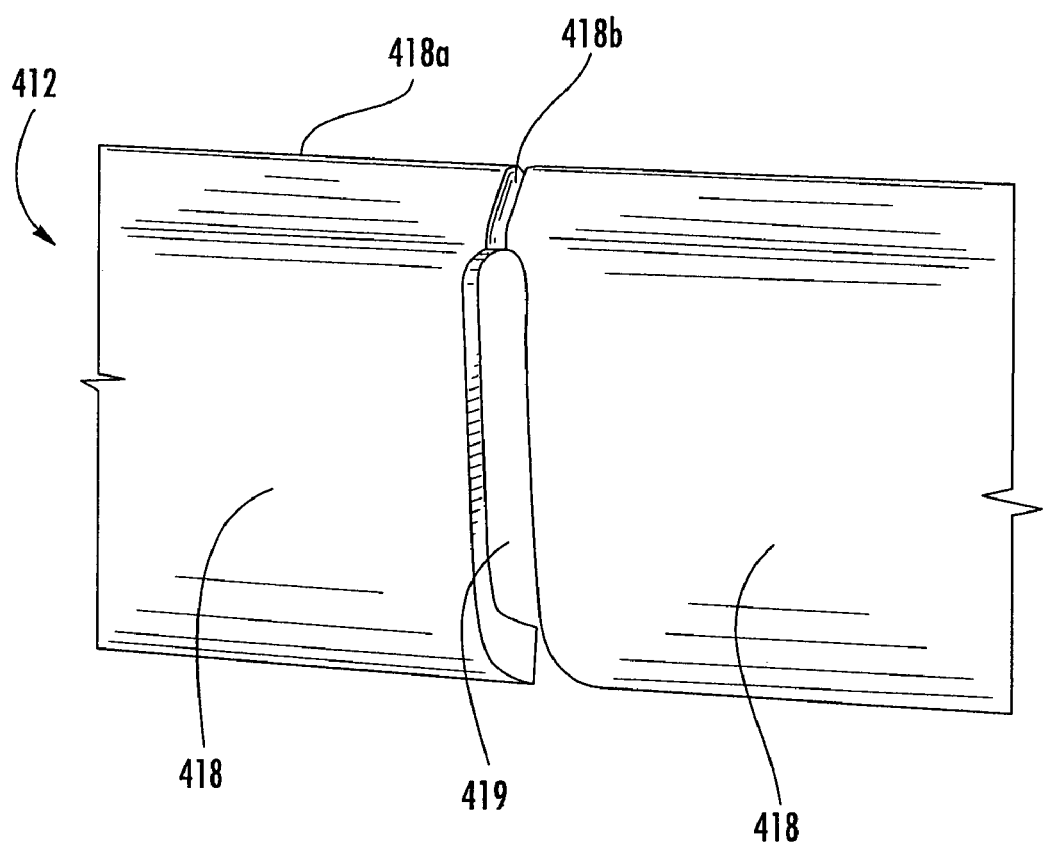
FIG. 21 is an enlarged perspective view of the bezel portion and user actuatable inputs of the mirror assembly of FIGS. 19 and 20.

Optionally, and with reference to FIGS. 19-21, an interior rearview mirror assembly 410 for a vehicle includes a bezel portion 412 and a mirror reflective element 414 positioned at the bezel portion 412. Mirror assembly 410 includes or is associated with an electronic accessory or device or circuitry or display (such as a temperature or directional indicating display or the like), and includes one or more user inputs or buttons or switches 418 positioned along a perimeter region of the reflective element 414 for activating/deactivating and/or controlling the electronic accessory. Inputs 418 are integrally formed with bezel portion 412 and are defined by notches or slots or gaps or breaks in the bezel portion (such as the generally vertical notches 419 formed through the bezel portion at each side of each input as shown in FIGS. 19 and 20). Inputs 418 thus may flex at their upper flexible and integral end or portion 418a to actuate the electrical switches at the printed circuit board of the mirror assembly, such as in a similar manner as described above. The flexible or integral ends or portions of the inputs are integral with the bezel portion at the upper portions of the inputs in FIGS. 19 and 20, so that the body or actuating surface of the input is below the flexible portion and along the chin portion of the bezel of the mirror. However, it is envisioned that the integral, flexible portions of inputs may be at a lower portion of the input or button (such as a button along the chin portion of the bezel or optionally a button along the upper or eyebrow portion of the bezel) or may be at a laterally outer or inner portion of a side-located input or button, depending on the location of the inputs around the bezel portion and the desired operation of the inputs.

As can be seen in FIG. 21, the flexible integral portions 418a of inputs 418 may include a notch or recess 418b at the bezel surface to give the appearance of separate inputs or buttons. The gaps and recesses are thus formed to allow the bezel portion to flex so that a user may press one of the inputs to actuate or control an associated function. The gaps or slots in the bezel portion may be filled by a plastic or silicone component 419a, which may also function as the actuator of a tact switch and/or may function as a light pipe or LED diffuser or the like, while remaining within the spirit and scope of the present invention. Thus, the bezel portion itself may comprise the buttons or inputs, with no separate buttons or inputs being attached to the frame or to the bezel portion. The size of the buttons or inputs thus may substantially or entirely span the bezel portion to provide a substantially large user input or button at the bezel portion while providing a relatively narrow or thin bezel portion or chin portion at the mirror assembly. The inputs/buttons 418 and mirror assembly 410 may otherwise be substantially similar to the inputs and mirror assemblies discussed above, such that a detailed discussion of the inputs and mirror assemblies will not be repeated herein.

Figure 22:
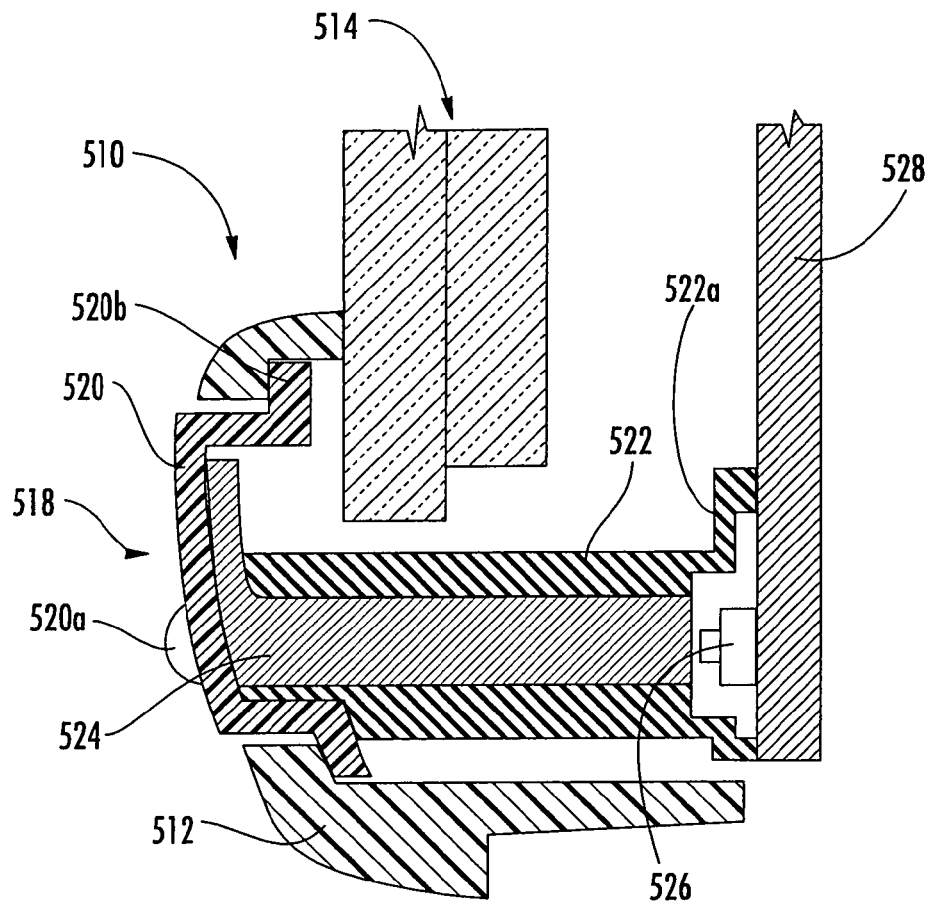
FIG. 22 is a sectional view of a bezel portion and user actuatable input of another mirror assembly in accordance with the present invention.

Optionally, and as shown in FIGS. 22-26, the user inputs or buttons may comprise inputs or buttons that are attached to and that are accessible at the bezel portion of the mirror assembly. For example, and with reference to FIGS. 22 and 23, a mirror assembly 510 for a vehicle includes a bezel portion 512 and a mirror reflective element 514 positioned at the bezel portion 512. Mirror assembly 510 includes or is associated with an electronic accessory or device or circuitry or display and includes one or more user inputs or buttons or switches 518 positioned along a perimeter region of the reflective element 514 for activating/deactivating and/or controlling the electronic accessory. User input 518 comprises a switch cap 520 (such as a plastic cap element or portion that forms an outer touch surface for a user to see and press to actuate the input) and a body portion 522 (such as a rubber or elastomeric body portion) that extends from an inner surface of the cap 520 toward a printed circuit board 528 of the mirror assembly. The printed circuit board 528 includes one or more electronic switches 526 disposed thereat for actuation by the button or input 518, such as in a similar manner as described above. As can be seen in FIG. 22, body portion 522 may include flexible legs 522a that engage the printed circuit board 528 generally at or near electronic switch 526 and that flex as the user input is depressed by a user (and that may provide a haptic feedback to the user when the input is depressed).

Figure 23:
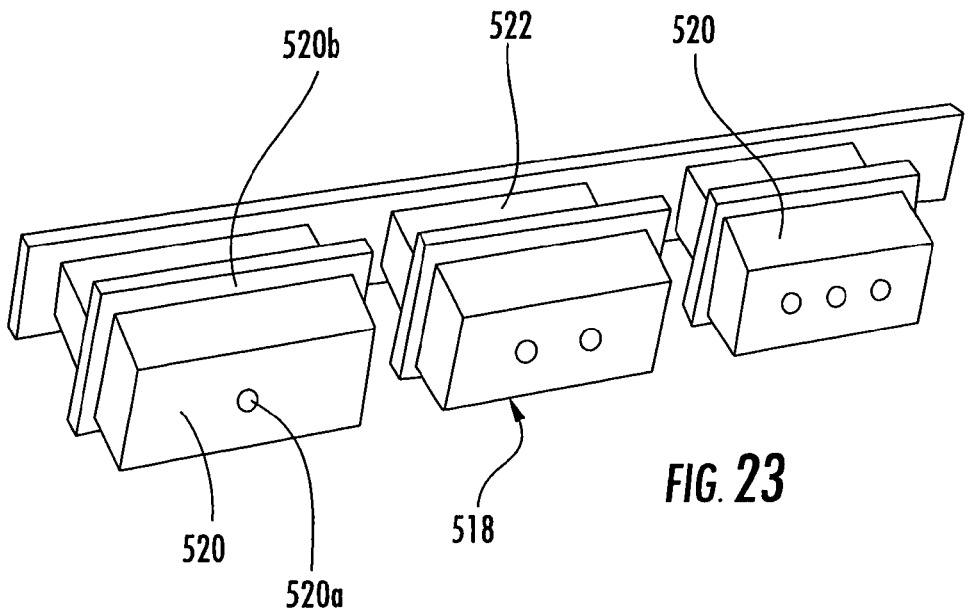
FIG. 23 is a perspective view of a plurality of user actuatable inputs suitable for use in the mirror assemblies of FIG. 22.

In the illustrated embodiment of FIG. 22, user input 518 includes a light pipe 524 (such as a light pipe or illumination means such as, for example, the light-piping described in U.S. pat. application, Ser. No. 10/229,573, filed Aug. 28, 2002 by Blank for VEHICLE MIRROR SYSTEM WITH LIGHT CONDUITING MEMBER, and published Mar. 6, 2003 as Publication No. U.S. 2003/0043589, now U.S. Pat. No. 7,008,090, which is hereby incorporated herein by reference in its entirety) for illuminating or backlighting cap 520 so as to enhance viewability of the user input, particularly in low lighting conditions. Body 522 may be formed around or partially around light pipe 524 so that light pipe 524 extends from the inner or rear surface of cap 520 toward the printed circuit board 528 and electronic switch 526 (and/or an illumination source or LED disposed at the printed circuit board). Optionally, other light transmitting or light emitting means or illumination sources may be implemented to illuminate or back light cap 520 while remaining within the spirit and scope of the present invention. Optionally, cap 520 may include a raised portion or protrusion or rib or haptic/tactile/texture structure or element 520a for easier "no-look" switch finding. The rib or haptic/tactile/texture structure or element assists a user in actuating the buttons by guiding the user's finger so that the user presses in the appropriate area of the switch. Cap 520 includes flared out flanges or lips 520b that engage the bezel portion 512 to limit outward movement of the inputs 518 at the bezel portion. As can be seen in FIG. 22, when released the user inputs may protrude slightly from the bezel portion when the flanges 520b engage the bezel portion 512. The inputs/buttons 518 and mirror assembly may otherwise be substantially similar to the inputs and mirror assemblies discussed above, such that a detailed discussion of the inputs and mirror assemblies will not be repeated herein. Optionally, and as shown in FIG. 23, a plurality of user inputs 518 may be disposed along a strip and may be located at respective openings or apertures in bezel portion 512 and at respective electronic switches 526 at the printed circuit board 528.

Figure 24A:
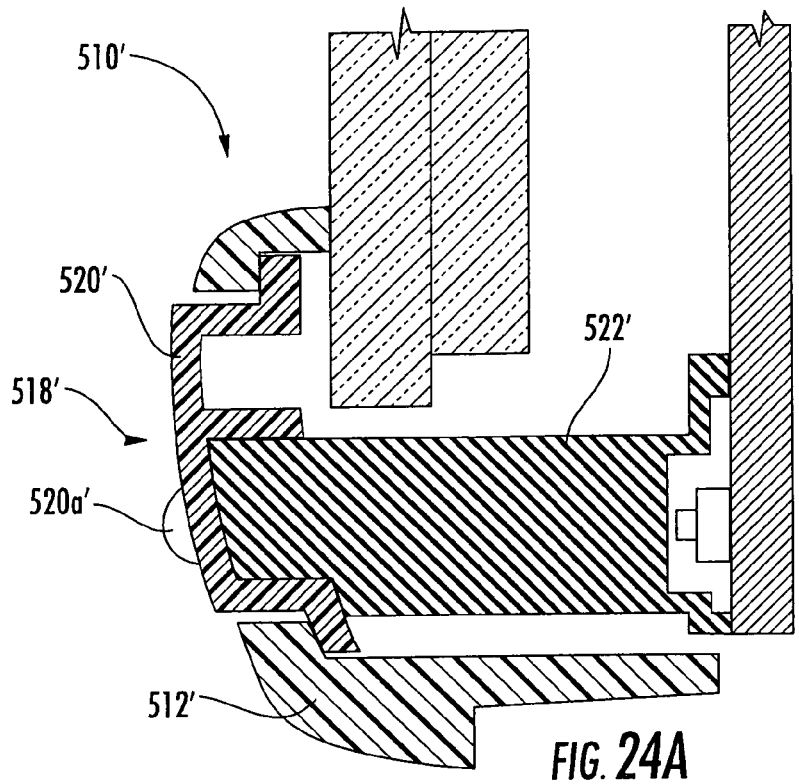
FIG. 24A is a sectional view of a bezel portion and user actuatable input of another mirror assembly in accordance with the present invention, with an illuminated or backlit raised portion of an input surface.
Figure 24B:
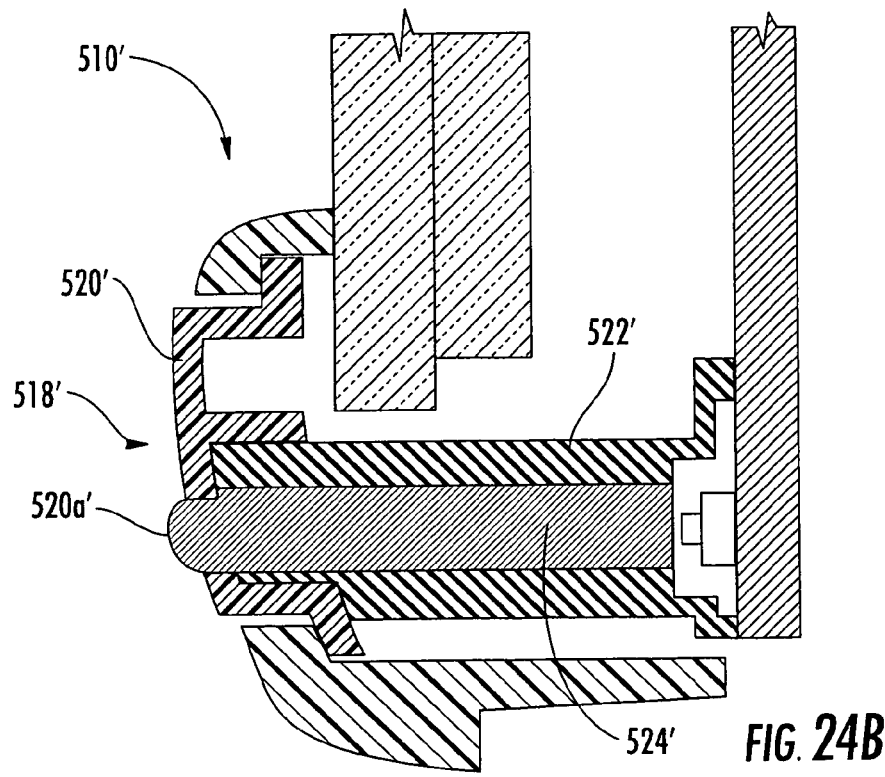
FIG. 24B is another sectional view of the bezel portion and user actuatable input of FIG. 24A, taken along a line remote from the raised portion of the input surface.

Optionally, and with reference to FIGS. 24A and 24B, a mirror assembly 510' and a bezel portion 512' may receive or support a user input 518' that includes a body portion 522' that is received within a portion of a cap 520', and that includes a light pipe 524' that extends through and along body portion 522' to illuminate or backlight a raised portion or rib element 520a' at cap 520'. The light pipe 524' thus may only illuminate or backlight a portion of the cap 520', or the input 518' may not include any light pipe or illumination means, depending on the particular application of the input and the mirror assembly. The user inputs and mirror assemblies may be otherwise substantially similar as the user inputs and mirror assemblies described herein, such that a detailed discussion of the user inputs and mirror assemblies need not be repeated herein. The common or similar components or features are shown in FIGS. 24A and 24B with similar reference numbers as used in FIG. 22.

Figure 25:
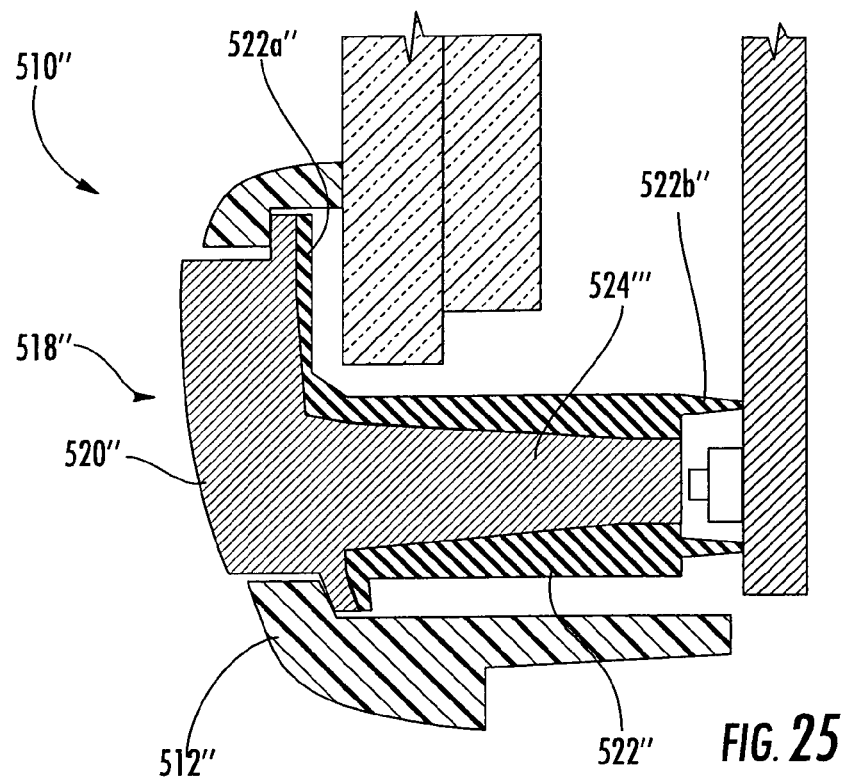
FIG. 25 is a sectional view of a bezel portion and user actuatable input of another mirror assembly in accordance with the present invention.
Figure 26:
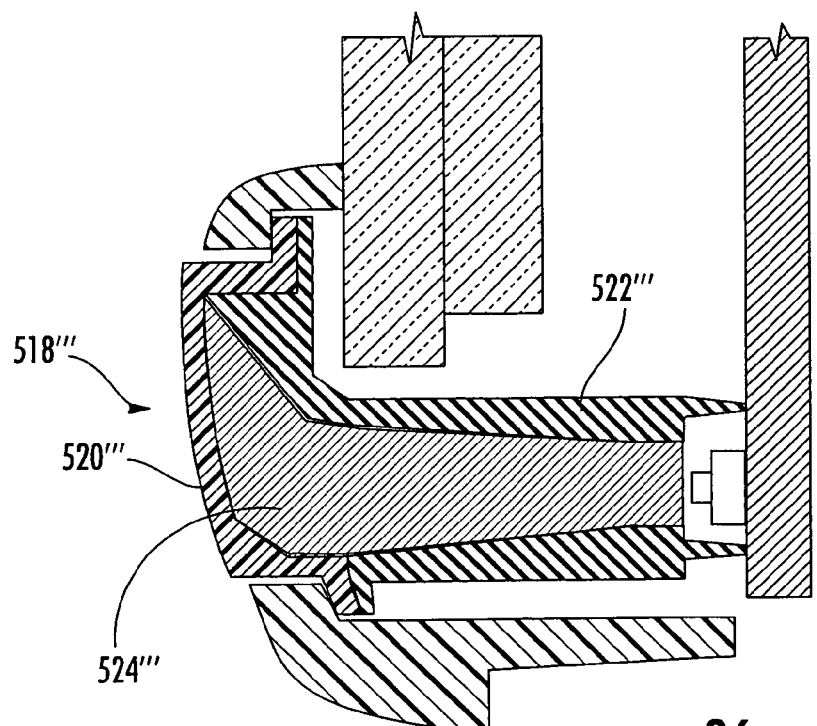
FIG. 26 is a sectional view of a bezel portion and user actuatable input of another mirror assembly in accordance with the present invention.

Optionally, and as shown in FIG. 25, a mirror assembly 510" and a bezel portion 512" may receive or support a user input 518". User input 518" includes a cap 520", which may be integrally formed with or unitary with a light pipe 524", which extends through and along a body portion 522" to illuminate or backlight a cap 520". Body portion 522" may include a flange or lip 522a" that extends along and encompasses the rear surface of the cap 520" to light leakage through cap 520" and into the mirror assembly and to provide an adhesion surface to enhance adhering of the body portion 522" to the rear of the cap 520" and light pipe 524". The flange 522a" may be dark or opaque and may be painted to substantially limit transmission of light therethrough. The body portion 522" may include flexible thin legs 522b" that flex as the user input is depressed. The thin legs may act as a flexible web and may comprise substantially straight legs, since it may be difficult to form an elastomeric body portion with a flared outward flange at one end and flared outward legs at the other end of the body portion. Optionally, and as shown in FIG. 26, the cap 520''' of a user input 518''' may attach to the body portion 522''' with the light pipe 524''' disposed within and along the body portion 522''', while remaining within the spirit and scope of the present invention. User inputs 518", 518''' may be otherwise substantially similar to the user inputs described herein so that a detailed discussion of the user inputs need not be repeated herein.

In the illustrated embodiments, the reflective element comprises an electro-optic or electrochromic reflective element assembly or cell. The electrochromic reflective element assembly of the electrochromic mirror assembly may utilize the principles disclosed in commonly assigned U.S. Pat. Nos. 6,690,298; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein; and/or as described in U.S. pat. application, Ser. No. 10/054,633, filed Jan. 22, 2002, now U.S. Pat. No. 7195,381, which is hereby incorporated herein by reference in their entireties. Optionally, the electrochromic circuitry and/or a glare sensor (such as a rearward facing glare sensor that receives light from rearward of the mirror assembly and vehicle through a port or opening 44 along the frame portion and/or bezel portion of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530, 240 and/or 6,329,925, which are hereby incorporated herein by reference in their entireties, and/or display-on-demand transflective type displays, such as the types disclosed in U.S. Pat. Nos. 6,690,268; 5,668,663 and/or 5,724,187, and/or in U.S. patent applications Ser. No. 10/054,633, filed Jan. 22, 2002 by Lynam et al. for VEHICULAR LIGHTING SYSTEM, now U.S. Pat. No. 7,195,381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/021, 065, filed Dec. 23, 2004 by McCabe et al. for ELECTRO-OPTIC MIRROR CELL, now U.S. Pat. No. 7,255,451; Ser. No. 11/226,628, filed Sep. 14, 2005 by Karner et al.; and/or PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633; PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication No. WO 2004/042457; PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540; and/or PCT Application No. PCT/US2006/018567, filed May 15, 2006 by Donnelly Corp. et al. for VEHICLE MIRROR ASSEMBLY WITH INDICIA AT REFLECTIVE ELEMENT, and published Nov. 23, 2006 as International Publication No. WO 2006/124682, which are all hereby incorporated herein by reference in their entireties.

Although shown and described as having an electro-optic reflective element, the interior rearview mirror assembly of the present invention may optionally have prismatic reflective element. Optionally, the prismatic reflective element may comprise a display on demand or transflective prismatic element (such as described in PCT Application No. PCT/US2006/018567, filed May 15, 2006 by Donnelly Corp. et al. for VEHICLE MIRROR ASSEMBLY WITH INDICIA AT REFLECTIVE ELEMENT, and published Nov. 23, 2006 as International, Publication No. WO 2006/124682; and/or PCT Application No. PCT/US03/29776, filed Sep. 19, 2003 by Donnelly Corp. et al. for MIRROR REFLECTIVE ELEMENT ASSEMBLY, and published Apr. 1, 2004 as International Publication No. WO 2004/026633; and/or U.S. pat. application, Ser. No. 10/993,302, filed Nov. 19, 2004, now U.S. Pat. No. 7,338,177; and/or U.S. provisional application, Ser. No. 60/525,952, filed Nov. 26, 2003 by Lynam for MIRROR REFLECTIVE ELEMENT FOR A VEHICLE, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Optionally, the mirror assembly and/or prismatic or electrochromic reflective element may include one or more displays, such as for the accessories or circuitry described herein. The displays may be similar to those described herein, or may be of types disclosed in U.S. Pat. Nos. 5,530,240 and/or 6,329,925, which are hereby incorporated herein by reference in their entireties, or may be display-on-demand or transflective type displays or other displays, such as the types disclosed in U.S. Pat. Nos. 6,690,268; 5,668,663 and/or 5,724,187, and/or in U.S. pat. applications, Ser. No. 10/054, 633, filed Jan. 22, 2002 by Lynam et al. for VEHICULAR LIGHTING SYSTEM, now U.S. Pat. No. 7,195,381; Ser. No. 11/021,065, filed Dec. 23, 2004 by McCabe et al. for ELECTRO-OPTIC MIRROR CELL now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/226,628, filed Sep. 14, 2005 by Karner et al.; Ser. No. 10/993,302, filed Nov. 19, 2004, now U.S. Pat. No. 7,338, 177; and/or Ser. No. 11/284,543, filed Nov. 22, 2005, now U.S. Pat. No. 7,370,983, and/or PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633; PCT Application No. PCT/US2006/018567, filed May 15, 2006 by Donnelly Corp. et al. for VEHICLE MIRROR ASSEMBLY WITH INDICIA AT REFLECTIVE ELEMENT, and published Nov. 23, 2006 as International Publication No. WO 2006/124682; and/or PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication No. WO 2004/042457; and/or U.S. provisional applications, Ser. No. 60/630,061, filed Nov. 22, 2004 by Lynam et al. for MIRROR ASSEMBLY WITH VIDEO DISPLAY; Ser. No. 60/667,048, filed Mar. 31, 2005 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; Ser. No. 60/563, 342, filed Apr. 19, 2004; Ser. No. 60/681,250, filed May 16, 2005; Ser. No. 60/690,400, filed Jun. 14, 2005; Ser. No. 60/695,149, filed Jun. 29, 2005; and/or Ser. No. 60/717,093, filed Sep. 14, 2005 by Lynam; Ser. No. 60/730,334, filed Oct. 26, 2005 by Baur for VEHICLE MIRROR ASSEMBLY WITH INDICIA AT REFLECTIVE ELEMENT; and/or Ser. No. 60/732,245, filed Nov. 1, 2005, and/or PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, which are all hereby incorporated herein by reference in their entireties, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, U.S. patent application Ser. No. 11/284,543, filed Nov. 22, 2005, now U.S. Pat. No. 7,370, 983, and/or U.S. provisional applications, Ser. No. 60/630, 061, filed Nov. 22, 2004 by Lynam et al. for MIRROR ASSEMBLY WITH VIDEO DISPLAY; and Ser. No. 60/667, 048, filed Mar. 31, 2005 by Lynam et al. for MIRROR ASSEMBLY WITH VIDEO DISPLAY, which are hereby incorporated herein by reference in their entireties.

Although shown and described as displaying directional heading information and/or temperature information, clearly the display or display elements described above may be operable to display other vehicle information or accessory status information or the like, without affecting the scope of the present invention. For example, the display and inputs may be associated with a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,690,268; 6,672,744; 6,386,742; and 6,124,886, and/or U.S. pat. applications, Ser. No. 10/739,766, filed Dec. 18, 2003 by DeLine et al. for MODULAR REARVIEW MIRROR ASSEMBLY, now U.S. Pat. No. 6,877,888; and/or Ser. No. 10/355,454, filed Jan. 31, 2003 by Schofield et al. for VEHICLE ACCESSORY MODULE, now U.S. Pat. No. 6,824,281; and/or PCT Application No. PCT/US03/03012, filed Jan. 31, 2003 by Donnelly Corporation for VEHICLE ACCESSORY MODULE; PCT Application No. PCT/US03/40611, filed Dec. 19, 2003 by Donnelly Corporation for ACCESSORY SYSTEM FOR VEHICLE, and published Jul. 15, 2004 as International Publication No. WO 2004/058540; and/or PCT Application No. PCT/US04/15424, filed May 18, 2004 by Donnelly Corporation et al. for MIRROR ASSEMBLY FOR VEHICLE, and published Dec. 2, 2004 as International Publication No. WO 2004/103772, which are hereby incorporated herein by reference in their entireties.

Optionally, the casing or cap portion and/or circuit board and/or mirror assembly may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. pat. applications, Ser. No. 10/054, 633, filed Jan. 22, 2002, now U.S. Pat. No. 7,195,381; Ser. No. 10/745,056, filed Dec. 22, 2003 by Lynam et al. for LIGHT MODULE FOR INTERIOR REARVIEW MIRROR ASSEMBLY, now U.S. Pat. No. 6,971,775; and/or Ser. No. 10/933,842, filed Sep. 3, 2004 by Kulas et al. for INTERIOR REARVIEW MIRROR ASSEMBLY, now U.S. Pat. No. 7,249,860, which are hereby incorporated herein by reference in their entireties, may be included in the mirror assembly. The illumination sources and/or the circuit board may be connected to one or more buttons or inputs for activating and deactivating the illumination sources. Optionally, the cap portion and/or the circuit board and/or the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in PCT Application No. PCT/US03/308877, filed Oct. 1, 2003 by Donnelly Corp. et al. for MICROPHONE SYSTEM FOR VEHICLE, and published Apr. 15, 2004 as International Publication No. WO 2004/032568. Optionally, the cap portion and/or the circuit board and/or the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. pat. applications, Ser. No. 10/427,051, filed Apr. 30, 2003, now U.S. Pat. No. 7,038,577; Ser. No. 10/209,173, filed Jul. 31, 2002, now U.S. Pat. No. 6,882,287; and/or Ser. No. 11/315,675, filed Dec. 22, 2005; and/or U.S. provisional applications, Ser. No. 60/638, 687, filed Dec. 23, 2004; Ser. No. 60/696,953, filed Jul. 6, 2006; and/or Ser. No. 60/784,570, filed Mar. 22, 2006, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. pat. applications, Ser. No. 11/105,757, filed Apr. 14, 2005; and/or Ser. No. 11/239,980, filed Sep. 30, 2005, a slide out or extendable/retractable vide device or module, such as described in U.S. patent application Ser. No. 11/284,543, filed Nov. 22, 2005, now U.S. Pat. No. 7,370,983; and U.S. provisional applications, Ser. No. 60/630,061, filed Nov. 22, 2004; and/or Ser. No. 60/667,048, filed Mar. 31, 2005; and/or PCT Application No. PCT/US03/40611, filed Dec. 19, 2003, and published Jul. 15, 2004 as International Publication No. WO 2004/058540, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4 wd/2 wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731, 205; and/or U.S. patent application Ser. No. 11/232,324, flied Sep. 21, 2005 by O'Brien et al. for TIRE PRESSURE ALERT SYSTEM, now U.S. Pat. No. 7,423,522; and/or U.S. provisional application, Ser. No. 60/611,796, filed Sep. 21, 2004, and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the accessory module and/or mirror assembly may accommodate other accessories or circuitry or the like as well, such as a rain sensor or imaging device or the like. For example, the mirror assembly may include a mounting portion (such as the types described in U.S. patent application Ser. No. 11/226,628, filed Sep. 14, 2005; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference in their entireties), and may include a rain sensor or the like and may position the rain sensor against the windshield, such as described in U.S. Pat. Nos. 6,250,148; 6,341,523; 6,516,664; 6,968,736; and 6,824,281, and in U.S. pat. application Ser. No. 10/958,087, filed Oct. 4, 2004 by Schofield et al. for VEHICLE ACCESSORY MODULE, now U.S. Pat. No. 7,188,963, which are all hereby incorporated herein by reference in their entireties. Optionally, the mirror assembly may include an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. pat. applications, Ser. No. 09/441,341, filed Nov. 16, 1999 by Schofield et al. for VEHICLE HEADLIGHT CONTROL USING IMAGING SENSOR, now U.S. Pat. No. 7,339,149; Ser. No. 11/315,675, filed Dec. 22, 2005; and/or Ser. No. 10/427,051, filed Apr. 30, 2003 by Pawlicki et al. for OBJECT DETECTION SYSTEM FOR VEHICLE, now U.S. Pat. No. 7,038,577, and/or U.S. provisional application, Ser. No. 60/638,687, filed Dec. 23, 2004, which are all hereby incorporated herein by reference in their entireties.

Optionally, the inputs or switches or buttons may comprise other types of switches or buttons, such as touch or proximity sensing switches, such that the user may only have to lightly touch the input or approach the input with his or her finger. For example, the user inputs may comprise touch or proximity switches of the types described in PCT Application No. PCT/US03/40611, filed Dec. 19, 2003 by Donnelly Corporation for ACCESSORY SYSTEM FOR VEHICLE, and published Jul. 15, 2004 as International Publication No. WO 2004/058540; and/or U.S. Pat. Nos. 6,001,486; 6,310,611; 6,320,282; and 6,627,918; and/or U.S. pat. applications, Ser. No. 11/021,065, filed Dec. 23, 2004, now U.S. Pat. No. 7,255,451; Ser. No. 09/817,874, filed Mar. 26, 2001 by Quist et al. for INTERACTIVE AUTOMOTIVE REARVISION SYSTEM, now U.S. Pat. No. 7,224,324; Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924; Ser. No. 10/933,842, filed Sep. 3, 2004 by Kulas et al. for INTERIOR REARVIEW MIRROR ASSEMBLY, now U.S. Pat. No. 7,249,860; and/or Ser. No. 11/140,396, filed May 27, 2005, now U.S. Pat. No. 7,360,932; and/or U.S. provisional application, Ser. No. 60/563,342, filed Apr. 19, 2004 by Bareman et al. for METHOD OF MANUFACTURING ELECTRO-OPTIC MIRROR CELL, which are hereby incorporated herein by reference in their entireties, or the inputs may comprise other types of buttons or switches, such as those described in U.S. patent application Ser. No. 11/029,695, filed Jan. 5, 2005, now U.S. Pat. No. 7,253,723; and/or U.S. provisional applications, Ser. No. 60/553,517, filed Mar. 16, 2004; and Ser. No. 60/535,559, filed Jan. 9, 2004, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Therefore, the present invention provides an interior rearview mirror assembly which may have features, such as electronic accessories and/or displays or the like. The mirror assembly includes one or more user actuatable inputs, such as buttons or switches or the like, that are positioned at one or more perimeter regions of the reflective element and at a bezelless region. The inputs or buttons may be positioned at spaces between bezel segments, and may be sized and shaped to approximately or generally or substantially correspond to the height and shape of the adjacent bezel segments. The bezel of the present invention thus does not fully circumscribe the perimeter of the reflective element. The inputs or buttons may be readily snapped in place at the perimeter regions and may actuate or engage or contact an electrical switch within the mirror assembly when a user presses the button or input at the perimeter region of the reflective element. Thus, the present invention obviates the complexities associated with providing three-sided buttons within an enlarged bezel or "chin" portion of a mirror assembly. For example, the present invention does not require or utilize a bezel including a section of material defining a three-sided button opening having an open side on a face of the bezel, nor does the present invention require or utilize a bezel having a ring-shaped body, nor does the present invention require or utilize a bezel including a "chin" section of material below the bottom edge of the reflective viewing area that defines a button opening on a face of the bezel.

Changes and modification in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle comprising:
   a reflective element;
   a frame portion around a perimeter of said reflective element;
   at least one user input movably mounted to said frame portion;
   at least one bezel segment positioned partially but not completely around the perimeter of said reflective element and said frame portion, said at least one bezel segment terminating at a first terminal end and a second terminal end, said first and second terminal ends generally opposing one another and spaced apart by a gap, said gap between said opposed and spaced apart first and second terminal ends of said at least one bezel segment being devoid of said at least one bezel segment, said gap spanning a height dimension of said first and second terminal ends of at least one bezel segment proximate said gap, said height dimension comprising a generally vertical dimension of said at least one bezel segment when said interior rearview mirror assembly is normally mounted in a vehicle; and said at least one user input being mountable to said frame portion at said gap and in said gap between said first and second terminal ends of said at least one bezel segment and separate and distinct from any portion of said at least one bezel segment and being movable by a user to engage and actuate an electronic switch within said interior rearview mirror assembly, said at least one user input having a height dimension that generally matches the height dimension of said at least one bezel segment proximate said first and second terminal ends of said at least one bezel segment.

2. The interior rearview mirror assembly of claim 1, wherein said user input has an exterior surface that is curved to generally correspond with an exterior surface of said at least one bezel segment that is adjacent to said user input, said exterior surfaces of said user input and said at least one bezel segment cooperate to define a generally continuous trim portion along the perimeter region of said reflective element.

3. The interior rearview mirror assembly of claim 1, wherein said user input is configured to attach to an attachment element of said frame portion.

4. The interior rearview mirror assembly of claim 3, wherein said user input is pivotable about said attachment element to contact said electronic switch.

5. The interior rearview minor assembly of claim 4, wherein said user input includes an extension for contacting said electronic switch when said user input is pivoted about said attachment element in response to a user pressing said user input.

6. The interior rearview mirror assembly of claim 1, wherein said user input includes a haptic element at an outer surface thereof to assist a user in actuating said user input by guiding the user's finger so that the user presses in an appropriate area of said user input.

7. The interior rearview mirror assembly of claim 1 including an illumination source for illuminating said user input.

8. The interior rearview minor assembly of claim 7, wherein said user input is backlit by said illumination source.

9. The interior rearview mirror assembly of claim 8, wherein said user input includes a thin-walled region to allow for backlighting of said user input via said illumination source.

* * * * *

UNITED STATES PATENT AND TRADEMARK OFFICE
CERTIFICATE OF CORRECTION

PATENT NO. : 7,527,403 B2
APPLICATION NO. : 11/451639
DATED : May 5, 2009
INVENTOR(S) : John T. Uken It is certified that error appears in the above-identified patent and that said Letters Patent is hereby corrected as shown below:

Column 24:
Line 7, Claim 5, "minor" should be --mirror--.
Line 19, Claim 8, "minor" should be --mirror--.

Signed and Sealed this

Thirteenth Day of October, 2009

David J. Kappos
*Director of the United States Patent and Trademark Office*